United States Patent
Deguchi et al.

(10) Patent No.: US 12,259,030 B2
(45) Date of Patent: Mar. 25, 2025

(54) VEHICLE DRIVE DEVICE

(71) Applicant: AISIN CORPORATION, Kariya (JP)

(72) Inventors: Tsubasa Deguchi, Kariya (JP); Tomoko Okimoto, Kariya (JP); Mitsuhiko Kato, Kariya (JP); Takayuki Doi, Kariya (JP); Tatsuya Ito, Kariya (JP); Ryota Takahashi, Kariya (JP); Chisami Matsumoto, Kariya (JP); Hideharu Kusunoki, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 18/690,901

(22) PCT Filed: Oct. 20, 2022

(86) PCT No.: PCT/JP2022/039140
§ 371 (c)(1),
(2) Date: Mar. 11, 2024

(87) PCT Pub. No.: WO2023/068334
PCT Pub. Date: Apr. 27, 2023

(65) Prior Publication Data
US 2024/0392865 A1    Nov. 28, 2024

(30) Foreign Application Priority Data

Oct. 20, 2021 (JP) .................................. 2021-171698
Dec. 28, 2021 (JP) .................................. 2021-214699

(51) Int. Cl.
*F16H 57/02* (2012.01)
*B60K 1/00* (2006.01)
(Continued)

(52) U.S. Cl.
CPC ............. *F16H 37/082* (2013.01); *B60K 1/00* (2013.01); *B60K 17/16* (2013.01); *F16H 48/08* (2013.01);
(Continued)

(58) Field of Classification Search
CPC ...... F16H 37/082; F16H 48/08; F16H 57/021; F16H 57/037; F16H 2057/02034; F16H 2057/02043; B60K 1/00; B60K 17/16
See application file for complete search history.

(56) References Cited

U.S. PATENT DOCUMENTS 10,539,225 B2    1/2020  Nakano et al.
2007/0093344 A1  4/2007  Kira et al.
(Continued)

FOREIGN PATENT DOCUMENTS

EP    1950076 A1 *  7/2008  ........... B60K 17/046
JP    2002-104001 A   4/2002
(Continued)

OTHER PUBLICATIONS

Dec. 27, 2022 International Search Report issued in International Patent Application No. PCT/JP2022/039140.
(Continued)

*Primary Examiner* — Justin Holmes
(74) *Attorney, Agent, or Firm* — Oliff PLC

(57) ABSTRACT

A first rotating element is a first sun gear that rotates with a rotor. A third rotating element is a first ring gear connected to a case. A fourth rotating element is a second ring gear that rotates with an input element. A second rotating element is a first carrier rotatably supporting a first pinion gear and a second pinion gear that rotate together. The first pinion gear meshes with the first sun gear and the first ring gear. The second pinion gear has a smaller diameter than the first pinion gear and meshes with the second ring gear. The first
(Continued)

sun gear is supported in a radial direction with respect to the case via a first support bearing. The second ring gear and the input element are connected such that their relative movement in the radial direction is restricted.

6 Claims, 7 Drawing Sheets

(51) Int. Cl.
    *B60K 17/16*     (2006.01)
    *F16H 37/08*     (2006.01)
    *F16H 48/08*     (2006.01)
    *F16H 57/021*     (2012.01)
    *F16H 57/037*     (2012.01)

(52) U.S. Cl.
    CPC ......... *F16H 57/021* (2013.01); *F16H 57/037* (2013.01); *F16H 2057/02034* (2013.01); *F16H 2057/02043* (2013.01)

(56) References Cited

U.S. PATENT DOCUMENTS

2018/0076687 A1*   3/2018   Pritchard ............... H02K 11/33
2021/0234435 A1*   7/2021   Hibino ................... H02K 5/124

FOREIGN PATENT DOCUMENTS

JP         2021-124185 A     8/2021
WO    WO-2021137288 A1 *   7/2021

OTHER PUBLICATIONS

Oct. 1, 30, 2024 Extended Search Report in European Patent Application No. 22883637.5.

* cited by examiner

VEHICLE DRIVE DEVICE

TECHNICAL FIELD

The present disclosure relates to vehicle drive devices including a rotating electrical machine and a planetary gear mechanism.

BACKGROUND ART

Examples of such a vehicle drive device are disclosed in Patent Document 1 and Patent Document 2 below. In the following description of the background art, signs used in the referenced patent documents are shown in parentheses.

A planetary gear mechanism (4) of a vehicle drive device (1) of Patent Document 1 includes a sun gear (41), a ring gear (42), and a carrier (6, 7). The sun gear (41) is connected a rotor (21) of a rotating electrical machine (2) so as to rotate with the rotor (21). The ring gear (42) is fixed to a case (10). The carrier (6, 7) rotatably supports a first pinion gear (431) and a second pinion gear (432) that are connected to each other so as to rotate together. The first pinion gear (431) meshes with the sun gear (41). The second pinion gear (432) has a smaller diameter than the first pinion gear (431) and meshes with the ring gear (42). The carrier (6, 7) is connected to a differential case (50) of an output differential gear mechanism (5) so as to rotate with the differential case (50). The planetary gear mechanism (4) reduces the speed of rotation of the rotor (21) and transmits the resultant rotation to the output differential gear mechanism (5).

A planetary gear mechanism (3) of a vehicle drive device of Patent Document 2 includes a sun gear (S1), a carrier (C), a first ring gear (R1), and a second ring gear (R2) (see FIG. 4 of Patent Document 2). The sun gear (S1) is connected to a rotor of a rotating electrical machine (2) so as to rotate with the rotor. The carrier (C) rotatably supports a first pinion gear (P1) and a second pinion gear (P2) that are connected to each other so as to rotate together. The first pinion gear (P1) meshes with the sun gear (S1) and the first ring gear (R1). The second pinion gear (P2) has a smaller diameter than the first pinion gear (P1) and meshes with the second ring gear (R2). The first ring gear (R1) is fixed to the case (1). The second ring gear (R2) is connected to an output differential gear mechanism (4) that is a bevel gear type differential gear mechanism. The planetary gear mechanism (3) thus reduces the speed of rotation of the rotor of the rotating electrical machine (2) and transmits the resultant rotation to the output differential gear mechanism (4).

RELATED ART DOCUMENTS

Patent Documents

Patent Document 1: Japanese Unexamined Patent Application Publication No. 2021-124185 (JP 2021-124185 A)
Patent Document 2: Japanese Unexamined Patent Application Publication No. 2002-104001 (JP 2002-104001 A)

SUMMARY OF THE DISCLOSURE

Problem to be Solved by the Disclosure

In the vehicle drive device (1) of Patent Document 1, an input element of the planetary gear mechanism (4) is the sun gear (41), and an output element of the planetary gear mechanism (4) is the carrier (6, 7). In such a configuration, it is difficult to increase the reduction ratio of the planetary gear mechanism (4) unless the radial dimension of the planetary gear mechanism (4) is increased.

In the vehicle drive device (1) of Patent Document 1, the planetary gear mechanism (4) is disposed radially outward of the bevel gear type output differential gear mechanism (5). The axial dimension of the vehicle drive device (1) is thus reduced. As described above, however, the carrier (6, 7) that supports the first pinion gear (431) and the second pinion gear (432) is connected to the differential case (50) of the output differential gear mechanism (5) so as to rotate with the differential case (50). Therefore, in the case where the planetary gear mechanism (4) is disposed radially outward of the output differential gear mechanism (5), the vehicle drive device (1) tends to be large in the radial direction.

The planetary gear mechanism (3) of the vehicle drive device of Patent Document 2 has a configuration that easily ensures a high reduction ratio while reducing the radial dimension. A differential case (DC) of the output differential gear mechanism (4) is typically supported by the case (1) on both sides in the axial direction with respect to a plurality of gears (DP1, DP2, DSI1, DSI2) constituting the output differential gear mechanism (4). The vehicle drive device of Patent Document 2 does not describe such a support structure for the output differential gear mechanism (4).

It is desired to implement such a vehicle drive device including a planetary gear mechanism for speed reduction and an output differential gear mechanism that facilitates reduction in size of the vehicle drive device while ensuring that the planetary gear mechanism has a high reduction ratio and allowing appropriate support of the output differential gear mechanism.

Means for Solving the Problem

A characteristic configuration of a vehicle drive device in view of the above is as follows: the vehicle drive device includes: a rotating electrical machine including a rotor; a first output member drivingly connected to a first wheel; a second output member drivingly connected to a second wheel; a planetary gear mechanism that reduces a speed of rotation of the rotor; an output differential gear mechanism that includes an input element and that distributes rotation transmitted from the planetary gear mechanism to the input element to the first output member and the second output member; and a case housing the rotating electrical machine, the planetary gear mechanism, and the output differential gear mechanism. The rotating electrical machine, the first output member, the second output member, the planetary gear mechanism, and the output differential gear mechanism are disposed coaxially. The planetary gear mechanism includes a first rotating element, a second rotating element, a third rotating element, and a fourth rotating element, and is configured in such a manner that rotational speeds of the first to fourth rotating elements are in the order of the first rotating element, the second rotating element, the third rotating element, and the fourth rotating element. The first rotating element is a first sun gear connected to the rotor so as to rotate with the rotor. The third rotating element is a first ring gear connected to the case. The fourth rotating element is a second ring gear connected to the input element so as to rotate with the input element. The second rotating element is a first carrier rotatably supporting a first pinion gear and a second pinion gear that rotate together. The first pinion gear meshes with the first sun gear and the first ring gear. The second pinion gear has a smaller diameter than the first pinion gear and meshes with the second ring gear. The first sun gear is supported in a radial direction with respect to the case via a first support bearing, and the second ring gear and the input element are connected in such a manner that relative movement between the second ring gear and the input element in the radial direction is restricted, the radial direction being a direction perpendicular to a rotation axis of the rotor.

According to this characteristic configuration, the first rotating element of the planetary gear mechanism is connected to the rotor. The third rotating element of the planetary gear mechanism is connected to the case, and the fourth rotating element of the planetary gear mechanism is connected to the input element of the output differential gear mechanism. Each of the third rotating element and the fourth rotating element of the planetary gear mechanism is a ring gear. It is therefore easy to ensure that the planetary gear mechanism functioning as a speed reducer that reduces the speed of rotation of the rotor and transmits the resultant rotation to the output differential gear mechanism has a high reduction ratio (e.g., 17 to 22).

According to this characteristic configuration, the fourth rotating element connected to the input element of the output differential gear mechanism is a ring gear. It is therefore easy to dispose the planetary gear mechanism close to the output differential gear mechanism in the axial direction while reducing the radial dimension of the planetary gear mechanism, compared to a configuration in which the rotating element connected to the input element of the output differential gear mechanism is a sun gear or a carrier.

According to this characteristic configuration, the third rotating element connected to the case is a ring gear. It is therefore easy to implement a configuration in which a support member etc. extending in the radial direction and required when a sun gear or a carrier is connected to the case can be omitted. This facilitates reduction in axial dimension of the vehicle drive device.

According to this characteristic configuration, the first sun gear that is the first rotating element of the planetary gear mechanism is supported in the radial direction with respect to the case via the first support bearing. The second ring gear that is the fourth rotating element of the planetary gear mechanism and the input element of the output differential gear mechanism are connected in such a manner that their relative movement in the radial direction is restricted. The input element of the output differential gear mechanism can therefore be supported in the radial direction using the alignment function (self-alignment function) of the planetary gear mechanism. As a result, it is possible to appropriately support the output differential gear mechanism while omitting a member such as a bearing that supports the input element of the output differential gear mechanism in the radial direction with respect to the case. This facilitates reduction in size and cost of the vehicle drive device.

As described above, this characteristic configuration facilitates reduction in size of a vehicle drive device including a planetary gear mechanism for speed reduction and an output differential gear mechanism, while ensuring that the planetary gear mechanism has a high reduction ratio and allowing appropriate support of the output differential gear mechanism.

MODES FOR CARRYING OUT THE DISCLOSURE

1. First Embodiment

Figure 1:
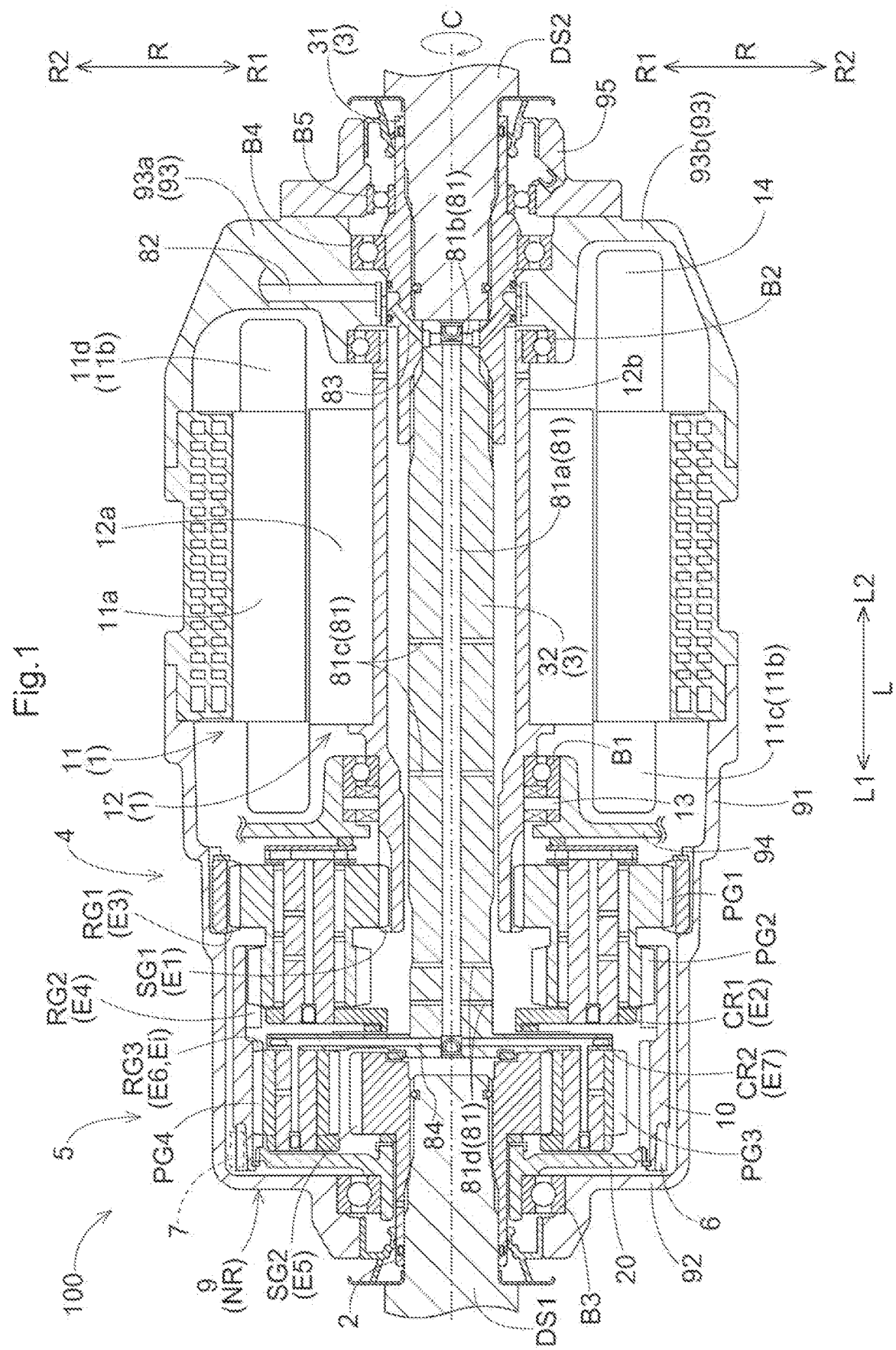
FIG. 1 is a sectional view taken along an axial direction of a vehicle drive device according to a first embodiment.
Figure 2:
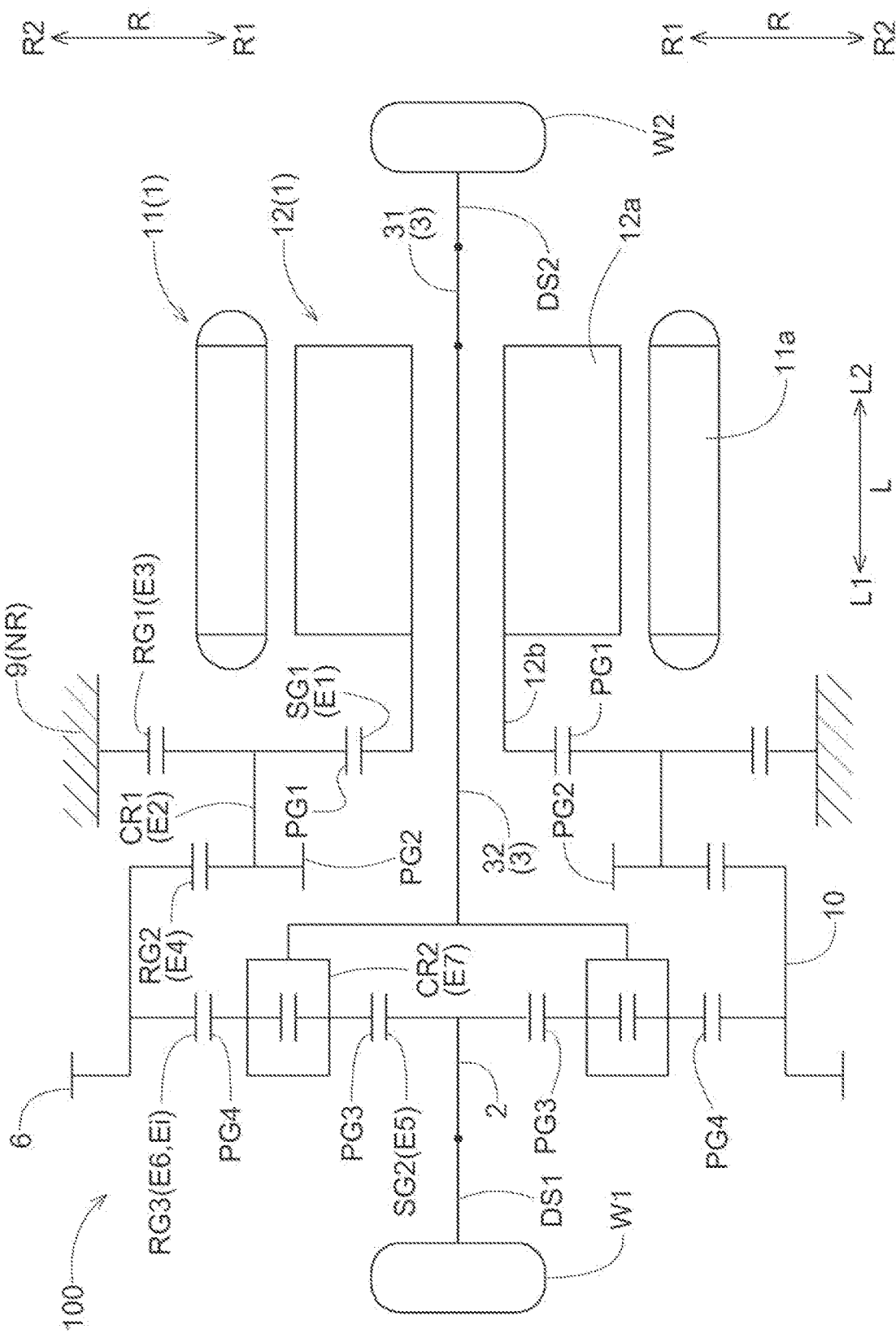
FIG. 2 is a skeleton diagram of the vehicle drive device according to the first embodiment.

Hereinafter, a vehicle drive device 100 according to a first embodiment will be described with reference to FIGS. 1 to 3. As shown in FIGS. 1 and 2, the vehicle drive device 100 includes: a rotating electrical machine 1 including a stator 11 and a rotor 12; a first output member 2 drivingly connected to a first wheel W1; a second output member 3 drivingly connected to a second wheel W2; a planetary gear mechanism 4; an output differential gear mechanism 5; and a case 9.

In the present application, "drivingly connected" refers to a state in which two rotating elements are connected such that a driving force can be transmitted therebetween, and includes a state in which the two rotating elements are connected so as to rotate together or a state in which the two rotating elements are connected such that a driving force can be transmitted therebetween via one or more transmission members. Such transmission members include various members that transmit rotation at the same speed or at a shifted speed, such as a shaft, a gear mechanism, a belt, and a chain. The transmission members may include an engagement device that selectively transmits rotation and a driving force, such as a friction engagement device and an intermesh engagement device.

In the following description, the direction along a rotation axis (see long dashed short dashed line in FIG. 1) of the rotor 12 will be referred to as "axial direction L." One side in the axial direction L will be referred to as "first side L1 in the axial direction," and the other side in the axial direction L will be referred to as "second side L2 in the axial direction." The direction perpendicular to the rotation axis of the rotor 12 will be referred to as "radial direction R." In the radial direction R, the rotation axis side of the rotor 12 will be referred to as "radially inner side R1," and the opposite side will be referred to as "radially outer side R2." The direction about the rotation axis of the rotor 12 will be referred to as "circumferential direction C."

The rotating electrical machine 1, the first output member 2, the second output member 3, the planetary gear mechanism 4, and the output differential gear mechanism 5 are disposed coaxially. In the present embodiment, the output differential gear mechanism 5, the planetary gear mechanism 4, and the rotating electrical machine 1 are arranged in this order from the first side L1 in the axial direction to the second side L2 in the axial direction. In the example shown in FIG. 1, the second output member 3 is disposed such that a part of the second output member 3 overlaps the rotating electrical machine 1 as viewed in the radial direction along the radial direction R. Regarding the arrangement of two elements, "overlap as viewed in a specific direction" means that, when an imaginary straight line parallel to the direction of the line of sight is moved in directions perpendicular to the imaginary straight line, there is an area where the imaginary straight line intersects both of the two elements.

The rotating electrical machine 1, the planetary gear mechanism 4, and the output differential gear mechanism 5 are housed in the case 9. In the present embodiment, the first output member 2 and the second output member 3 are housed in the case 9 such that the first output member 2 and the second output member 3 are partially exposed to the outside of the case 9.

As shown in FIG. 1, in the present embodiment, the case 9 includes a peripheral wall portion 91, a first side wall portion 92, a second side wall portion 93, a partition wall portion 94, and a cover portion 95.

The peripheral wall portion 91 has a tubular shape covering the radially outer side R2 of the rotating electrical machine 1, the first output member 2, the second output member 3, the planetary gear mechanism 4, and the output differential gear mechanism 5. The first side wall portion 92, the second side wall portion 93, and the partition wall portion 94 are each formed so as to extend in the radial direction R and the circumferential direction C. The cover portion 95 is provided so as to cover a part of the second side wall portion 93 from the second side L2 in the axial direction. In the present embodiment, the first side wall portion 92 is formed so as to cover the first side L1 in the axial direction of the output differential gear mechanism 5. The second side wall portion 93 is formed so as to cover the second side L2 in the axial direction of the rotating electrical machine 1. The partition wall portion 94 is disposed between the rotating electrical machine 1 and the planetary gear mechanism 4 in the axial direction L. The cover portion 95 is joined to the second side wall portion 93 from the second side L2 in the axial direction. In this example, the first side wall portion 92 is formed integrally with the peripheral wall portion 91 so as to close an opening on the first side L1 in the axial direction of the peripheral wall portion 91. The second side wall portion 93 is formed integrally with the peripheral wall portion 91 so as to close an opening on the second side L2 in the axial direction of the peripheral wall portion 91. In the example shown in FIG. 1, the peripheral wall portion 91 is divided at a plurality of positions (in this example, two positions) in the axial direction L. The divided portions of the peripheral wall portion 91 are joined to each other and fastened together by fastening members such as bolts, not shown.

The rotating electrical machine 1 functions as a driving force source for the first wheel W1 and the second wheel W2 (see FIG. 2). The rotating electrical machine 1 has a function as a motor (electric motor) that is supplied with electric power to generate power, and a function as a generator (electric power generator) that is supplied with power to generate electric power. Specifically, the rotating electrical machine 1 is electrically connected to an energy storage device such as a battery or a capacitor (not shown). The rotating electrical machine 1 generates a driving force by power running with electric power stored in the energy storage device. The rotating electrical machine 1 generates electric power with a driving force transmitted from the first wheel W1 and the second wheel W2 to charge the energy storage device.

The stator 11 of the rotating electrical machine 1 includes a cylindrical stator core 11a. The stator core 11a is fixed to a non-rotating member NR. In the present embodiment, the stator core 11a is fixed to the peripheral wall portion 91 of the case 9 that is the non-rotating member NR. The rotor 12 of the rotating electrical machine 1 includes a cylindrical rotor core 12a. The rotor core 12a is supported so as to be rotatable with respect to the stator core 11a. In the present embodiment, the rotor 12 further includes a rotor shaft 12b connected to the rotor core 12a so as to rotate with the rotor core 12a.

In the present embodiment, the rotating electrical machine 1 is an inner rotor rotating electrical machine. Therefore, the rotor core 12a is disposed in the radially inner side R1 of the stator core 11a. The rotor shaft 12b is disposed in the radially inner side R1 of the rotor core 12a.

In the present embodiment, the rotating electrical machine 1 is a revolving field rotating electrical machine. Therefore, the stator 11 further includes a coil 11b. In the present embodiment, the coil 11b is wound around the stator core 11a so as to form a first coil end portion 11c protruding from the stator core 11a toward the first side L1 in the axial direction and a second coil end portion 11d protruding from the stator core 11a toward the second side L2 in the axial direction. Although not shown in the figure, the rotor core 12a is provided with permanent magnets.

In the present embodiment, the rotor shaft 12b has a tubular shape having an axis in the axial direction L. In the present embodiment, the rotor shaft 12b is disposed so as to protrude from the rotor core 12a toward both sides in the axial direction L. In the present embodiment, a portion of the rotor shaft 12b that protrudes from the rotor core 12a toward the first side L1 in the axial direction is disposed so as to extend through the partition wall portion 94 of the case 9 in the axial direction L. The portion of the rotor shaft 12b that protrudes from the rotor core 12a toward the first side L1 in the axial direction is supported so as to be rotatable with respect to the partition wall portion 94 via a first bearing B1. A portion of the rotor shaft 12b that protrudes from the rotor core 12a toward the second side L2 in the axial direction is supported so as to be rotatable with respect to the second side wall portion 93 via a second bearing B2. In the present embodiment, a rotation sensor 13 that detects rotation of the rotor 12 is provided integrally with the first bearing B1.

The planetary gear mechanism 4 includes a first rotating element E1, a second rotating element E2, a third rotating element E3, and a fourth rotating element E4. The planetary gear mechanism 4 is configured so that the rotational speeds of these rotating elements are in the order of the first rotating element E1, the second rotating element E2, the third rotating element E3, and the fourth rotating element E4.

As used herein, the "order of rotational speeds" means the order of rotational speeds of the rotating elements in a rotating state. Although the rotational speeds of the rotating elements change depending on the rotating state of the planetary gear mechanism, the order of the rotational speeds of the rotating elements does not change because it is determined by the structure of the planetary gear mechanism. The order of the rotational speeds of the rotating elements is the same as the order of arrangement of the rotating elements in a speed diagram (see FIG. 3). The "order of arrangement of the rotating elements in a speed diagram" refers to the order in which the axes in the speed diagram that correspond to the rotating elements are arranged along a direction perpendicular to the axes. Although the direction of arrangement of the axes corresponding to the rotating elements in the speed diagram changes depending on how the speed diagram is drawn, the order of arrangement of the axes does not change because it is determined by the structure of the planetary gear mechanism.

The output differential gear mechanism 5 includes an input element Ei. The output differential gear mechanism 5 is configured to distribute rotation transmitted from the planetary gear mechanism 4 to the input element Ei to the first output member 2 and the second output member 3. In the present embodiment, the output differential gear mechanism 5 is a planetary gear mechanism including a fifth rotating element E5, a sixth rotating element E6, and a seventh rotating element E7. The output differential gear mechanism 5 is configured so that the rotational speeds of these rotating elements are in the order of the fifth rotating element E5, the sixth rotating element E6, and the seventh rotating element E7. In the present embodiment, the fifth rotating element E5 is connected to the first output member 2. The seventh rotating element E7 is connected to the second output member 3.

The planetary gear mechanism 4 functions as a speed reducer that reduces the speed of rotation of the rotor 12 and transmits the resultant rotation to the output differential gear mechanism 5. The first rotating element E1 of the planetary gear mechanism 4 is connected to the rotor 12 so as to rotate with the rotor 12. The third rotating element E3 of the planetary gear mechanism 4 is connected to the case 9. The fourth rotating element E4 of the planetary gear mechanism 4 is connected to the input element Ei of the output differential gear mechanism 5 so as to rotate with the input element Ei. In the present embodiment, the fourth rotating element E4 is formed integrally with the input element Ei. In the present embodiment, the input element Ei is the sixth rotating element E6.

The first rotating element E1 of the planetary gear mechanism 4 is a first sun gear SG1. The first sun gear SG1 is supported in the radial direction R with respect to the case 9 via the first bearing B1. The first bearing B1 corresponds to the "first support bearing" that supports the first sun gear SG1 in the radial direction R with respect to the case 9. In the present embodiment, the first sun gear SG1 is connected to the rotor shaft 12b so as to rotate with the rotor shaft 12b. As described above, in the present embodiment, the portion of the rotor shaft 12b that protrudes from the rotor core 12a toward the first side L1 in the axial direction is supported so as to be rotatable with respect to the partition wall portion 94 of the case 9 via the first bearing B1. Therefore, in the present embodiment, the first bearing B1 is supported by the partition wall portion 94 and is configured to support the first sun gear SG1 in the radial direction R and support the rotor 12 in the radial direction R. The partition wall portion 94 corresponds to the "first support wall portion" disposed between the rotating electrical machine 1 and the planetary gear mechanism 4 in the axial direction L. In the example shown in FIG. 1, the first sun gear SG1 is formed integrally with the rotor shaft 12b.

The second rotating element E2 of the planetary gear mechanism 4 is a first carrier CR1. The first carrier CR1 rotatably supports a first pinion gear PG1 and a second pinion gear PG2 that rotate together. The first pinion gear PG1 meshes with the first sun gear SG1 and a first ring gear RG1. The second pinion gear PG2 meshes with a second ring gear RG2. The second pinion gear PG2 has a smaller diameter than the first pinion gear PG1.

Each of the third rotating element E3 and the fourth rotating element E4 of the planetary gear mechanism 4 is a ring gear. Specifically, the third rotating element E3 is the first ring gear RG1. The fourth rotating element E4 is the second ring gear RG2. In the present embodiment, the sixth rotating element E6 of the output differential gear mechanism 5 is a third ring gear RG3. That is, in the present embodiment, the second ring gear RG2 that is the fourth rotating element E4 of the planetary gear mechanism 4 and the third ring gear RG3 that is the input element Ei, namely the sixth rotating element E6, of the output differential gear mechanism 5 are connected so as to rotate together.

The second ring gear RG2 and the input element Ei are connected such that their relative movement in the radial direction R is restricted. In the example shown in FIG. 1, the second ring gear RG2 and the third ring gear RG3 that is the input element Ei are integrally formed adjacent to each other in the axial direction L.

As described above, the vehicle drive device 100 includes: the rotating electrical machine 1 including the rotor 12; the first output member 2 drivingly connected to the first wheel W1; the second output member 3 drivingly connected to the second wheel W2; the planetary gear mechanism 4 that reduces the speed of rotation of the rotor 12; the output differential gear mechanism 5 that includes the input element Ei and that distributes rotation transmitted from the planetary gear mechanism 4 to the input element Ei to the first output member 2 and the second output member 3; and the case 9 housing the rotating electrical machine 1, the planetary gear mechanism 4, and the output differential gear mechanism 5. The rotating electrical machine 1, the first output member 2, the second output member 3, the planetary gear mechanism 4, and the output differential gear mechanism 5 are disposed coaxially. The planetary gear mechanism 4 includes the first rotating element E1, the second rotating element E2, the third rotating element E3, and the fourth rotating element E4, and is configured so that the rotational speeds of these rotating elements are in the order of the first rotating element E1, the second rotating element E2, the third rotating element E3, and the fourth rotating element E4. The first rotating element E1 is the first sun gear SG1 connected to the rotor 12 so as to rotate with the rotor 12. The third rotating element E3 is the first ring gear RG1 connected to the case 9. The fourth rotating element E4 is the second ring gear RG2 connected to the input element Ei so as to rotate with the input element Ei. The second rotating element E2 is the first carrier CR1 rotatably supporting the first pinion gear PG1 and the second pinion gear PG2 that rotate together. The first pinion gear PG1 meshes with the first sun gear SG1 and the first ring gear RG1. The second pinion gear PG2 has a smaller diameter than the first pinion gear PG1 and meshes with the second ring gear RG2. The first sun gear SG1 is supported in the radial direction R with respect to the case 9 via the first bearing B1 that is the first support bearing. The second ring gear RG2 and the input element Ei are connected such that their relative movement in the radial direction R is restricted.

According to this configuration, the first rotating element E1 of the planetary gear mechanism 4 is connected to the rotor 12. The third rotating element E3 of the planetary gear mechanism 4 is connected to the case 9, and the fourth rotating element E4 of the planetary gear mechanism 4 is connected to the input element Ei of the output differential gear mechanism 5. Each of the third rotating element E3 and the fourth rotating element E4 of the planetary gear mechanism 4 is a ring gear. It is therefore easy to ensure that the planetary gear mechanism 4 functioning as a speed reducer that reduces the speed of rotation of the rotor 12 and transmits the resultant rotation to the output differential gear mechanism 5 has a high reduction ratio (e.g., 17 to 22).

According to this configuration, the fourth rotating element E4 connected to the input element Ei of the output differential gear mechanism 5 is a ring gear. It is therefore easy to dispose the planetary gear mechanism 4 close to the output differential gear mechanism 5 in the axial direction L while reducing the dimension in the radial direction R of the planetary gear mechanism 4, compared to a configuration in which the rotating element connected to the input element Ei of the output differential gear mechanism 5 is a sun gear or a carrier.

According to this configuration, the third rotating element E3 connected to the case 9 is a ring gear. It is therefore easy to implement a configuration in which a support member etc. extending in the radial direction R and required when a sun gear or a carrier is connected to the case 9 can be omitted. This facilitates reduction in dimension in the axial direction L of the vehicle drive device 100.

According to this configuration, the first sun gear SG1 that is the first rotating element E1 of the planetary gear mechanism 4 is supported in the radial direction R with respect to the case 9 via the first bearing B1 that is the first support bearing. The second ring gear RG2 that is the fourth rotating element E4 of the planetary gear mechanism 4 and the input element Ei of the output differential gear mechanism 5 are connected such that their relative movement in the radial direction R is restricted. The input element Ei of the output differential gear mechanism 5 can therefore be supported in the radial direction R using the alignment function (self-alignment function) of the planetary gear mechanism 4. As a result, it is possible to appropriately support the output differential gear mechanism 5 while omitting a member such as a bearing that supports the input element Ei of the output differential gear mechanism 5 in the radial direction R with respect to the case 9. This facilitates reduction in size and cost of the vehicle drive device 100.

As described above, this configuration facilitates reduction in size of the vehicle drive device 100 including the planetary gear mechanism 4 for speed reduction and the output differential gear mechanism 5, while ensuring that the planetary gear mechanism 4 has a high reduction ratio and allowing appropriate support of the output differential gear mechanism 5.

As described above, in the present embodiment, the case 9 includes the partition wall portion 94 that is the first support wall portion disposed between the rotating electrical machine 1 and the planetary gear mechanism 4 in the axial direction L. The first bearing B1 that is the first support bearing is supported by the partition wall portion 94, and is configured to support the first sun gear SG1 in the radial direction R and support the rotor 12 in the radial direction R.

This configuration facilitates reduction in dimension in the axial direction L of the vehicle drive device 100 compared to a configuration in which both a bearing that supports the first sun gear SG1 in the radial direction R and a bearing that supports the rotor 12 in the radial direction R are provided.

As described above, in the present embodiment, the output differential gear mechanism 5 is a planetary gear mechanism including the fifth rotating element E5, the sixth rotating element E6, and the seventh rotating element E7 and configured so that the rotational speeds of these rotating elements are in the order of the fifth rotating element E5, the sixth rotating element E6, and the seventh rotating element E7. The fifth rotating element E5 is connected to the first output member 2, the seventh rotating element E7 is connected to the second output member 3, and the sixth rotating element E6 is the third ring gear RG3, namely the input element Ei.

According to this configuration, the fifth rotating element E5 and the seventh rotating element E7 of the output differential gear mechanism 5 are connected to the first output member 2 and the second output member 3, respectively. The output differential gear mechanism 5 can thus be formed as a planetary gear type differential gear mechanism. This facilitates reduction in dimension in the axial direction L of the vehicle drive device 100 compared to a configuration in which the output differential gear mechanism 5 is a bevel gear type differential gear mechanism.

According to this configuration, the third rotating element E3 and the fourth rotating element E4 of the planetary gear mechanism 4 are the first ring gear RG1 and the second ring gear RG2, respectively, and the sixth rotating element E6 of the output differential gear mechanism 5 is the third ring gear RG3. The first ring gear RG1 or the second ring gear RG2 is connected to the third ring gear RG3 so as to rotate with the third ring gear RG3. The fourth rotating element E4 and the sixth rotating element E6 can thus be connected in a region on the radially outer side R2 with respect to the planetary gear mechanism 4 and the output differential gear mechanism 5. Therefore, it is not necessary to connect these rotating elements using, for example, a connecting member extending in the radial direction R, which facilitates reduction in dimension in the axial direction L of the vehicle drive device 100.

In the present embodiment, the output differential gear mechanism 5 is a planetary gear mechanism including a second sun gear SG2, a second carrier CR2, and the third ring gear RG3, the second sun gear SG2 is connected to the first output member 2 so as to rotate with the first output member 2, the second carrier CR2 is connected to the second output member 3 so as to rotate with the second output member 3, and the third ring gear RG3 is the input element Ei.

According to this configuration, the second output member 3 connected to the second carrier CR2 can be supported in the radial direction R using the alignment function (self-alignment function) of the output differential gear mechanism 5 that is a planetary gear mechanism. As a result, it is possible to appropriately support the second output member 3 while omitting a member such as a bearing that supports the second output member 3 in the radial direction R with respect to the case 9. This facilitates reduction in size and cost of the vehicle drive device 100.

In the present embodiment, the output differential gear mechanism 5 is a double-pinion type planetary gear mechanism. In the present embodiment, the fifth rotating element E5 of the output differential gear mechanism 5 is the second sun gear SG2. The seventh rotating element E7 of the output differential gear mechanism 5 is the second carrier CR2. As described above, in the present embodiment, the sixth rotating element E6 of the output differential gear mechanism 5 is the third ring gear RG3. The second carrier CR2 rotatably supports a third pinion gear PG3 and a fourth pinion gear PG4 that mesh with each other. The third pinion gear PG3 meshes with the second sun gear SG2 and the fourth pinion gear PG4. The fourth pinion gear PG4 meshes with the third ring gear RG3 and the third pinion gear PG3.

As described above, in the present embodiment, the output differential gear mechanism 5 is a double-pinion type planetary gear mechanism, the fifth rotating element E5 is the second sun gear SG2, and the seventh rotating element E7 is the second carrier CR2.

According to this configuration, torque transmitted from the planetary gear mechanism 4 to the sixth rotating element E6 can be easily transmitted in equal proportion to the fifth rotating element E5 connected to the first output member 2 and the seventh rotating element E7 connected to the second output member 3, compared to a configuration in which the output differential gear mechanism 5 is a single-pinion type planetary gear mechanism.

As shown in FIG. 1, in the present embodiment, the vehicle drive device 100 further includes a parking gear 6 and a parking lock mechanism 7 that selectively engages with the parking gear 6.

The parking gear 6 is provided on a rotating member that is interlocked with the first wheel W1 and the second wheel W2 (see FIG. 2). In the present embodiment, the parking gear 6 is formed on a tubular member 10. The tubular member 10 has a tubular shape having an axis in the axial direction L. In addition to the parking gear 6, the second ring gear RG2 and the third ring gear RG3 are also formed on the tubular member 10. Therefore, in the present embodiment, the parking gear 6 is disposed so as to overlap the output differential gear mechanism 5 as viewed in the radial direction along the radial direction R. The parking gear 6 is connected to the third ring gear RG3 as the input element Ei of the output differential gear mechanism 5 so as to rotate with the third ring gear RG3. In the example shown in FIG. 1, the parking gear 6, the third ring gear RG3, and the second ring gear RG2 are arranged in this order from the first side L1 in the axial direction toward the second side L2 in the axial direction. In this example, the parking gear 6, the third ring gear RG3, and the second ring gear RG2 are integrally formed by cutting a single tubular member 10 etc.

As described above, in the present embodiment, the first ring gear RG1 is connected to the case 9. In the example shown in FIG. 1, the first ring gear RG1 is connected to the peripheral wall portion 91 of the case 9. More specifically, a spline engagement portion formed on the outer peripheral surface of the first ring gear RG1 and a spline engagement portion formed on the inner peripheral surface of the peripheral wall portion 91 engage with each other. The first ring gear RG1 is thus connected to the case 9 so as not to rotate with respect to the case 9.

As described above, in the present embodiment, the vehicle drive device 100 further includes the parking gear 6 and the parking lock mechanism 7 that selectively engages with the parking gear 6, the first ring gear RG1 is connected to the case 9, and the second ring gear RG2, the third ring gear RG3, and the parking gear 6 are formed on the same tubular member 10.

According to this configuration, the second ring gear RG2, the third ring gear RG3, and the parking gear 6 are formed integrally. This facilitates reduction in size of the vehicle drive device 100 in the axial direction L and the radial direction R compared to a configuration in which the second ring gear RG2, the third ring gear RG3, and the parking gear 6 are formed as separate members.

In the present embodiment, the parking gear 6 is disposed so as to overlap the output differential gear mechanism 5 as viewed in the radial direction along the radial direction R, and is connected to the input element Ei so as to rotate with the input element E1.

According to this configuration, the dimension in the axial direction L of the vehicle drive device 100 can be reduced compared to a configuration in which the parking gear 6 is disposed on one side in the axial direction L with respect to the output differential gear mechanism 5.

In the present embodiment, the tubular member 10 is connected to a support member 20 extending in the radial direction R so that the tubular member 10 rotates with the support member 20. The support member 20 is formed so as to extend from the tubular member 10 toward the radially inner side R1. In the present embodiment, the support member 20 is disposed on the first side L1 in the axial direction with respect to the output differential gear mechanism 5. The support member 20 is supported so as to be rotatable with respect to the first side wall portion 92 of the case 9 via a third bearing B3.

In the present embodiment, the first output member 2 is connected to the second sun gear SG2 so as to rotate with the second sun gear SG2. In the example shown in FIG. 1, the first output member 2 is formed integrally with the second sun gear SG2. In the present embodiment, the first output member 2 is disposed so as to extend through the support member 20 and the first side wall portion 92 of the case 9 in the axial direction L. The first output member 2 is connected to a first drive shaft DS1 drivingly connected to the first wheel W1 so that the first output member 2 rotates with the first drive shaft DSL. In the example shown in FIG. 1, the first output member 2 has a tubular shape having an axis in the axial direction L. The first drive shaft DS1 is inserted into the first output member 2 from the first side L1 in the axial direction so that the first drive shaft DS1 is located in the radially inner side R1 of the first output member 2. In this state, the first drive shaft DS1 and the first output member 2 are connected to each other by spline engagement.

In the present embodiment, the second output member 3 includes: a connecting member 31 connected to a second drive shaft DS2 drivingly connected to the second wheel W2 so that the connecting member 31 rotates with the second drive shaft DS2; and an output shaft 32 extending in the axial direction L so as to connect the connecting member 31 and the seventh rotating element E7.

In the present embodiment, the connecting member 31 is disposed so as to extend through the second side wall portion 93 and the cover portion 95 of the case 9 in the axial direction L. The connecting member 31 is supported so as to be rotatable with respect to the second side wall portion 93 via a fourth bearing B4, and is supported so as to be rotatable with respect to the cover portion 95 via a fifth bearing B5. In the example shown in FIG. 1, the second output member 3 has a tubular shape having an axis in the axial direction L. The second drive shaft DS2 is inserted into the second output member 3 from the second side L2 in the axial direction so that the second drive shaft DS2 is located in the radially inner side R1 of the second output member 3. In this state, the second drive shaft DS2 and the second output member 3 are connected to each other by spline engagement.

In the present embodiment, the output shaft 32 is disposed so as to extend through the planetary gear mechanism 4 in the axial direction L in the radially inner side R1 of the planetary gear mechanism 4, and to extend through the rotor core 12a in the axial direction L in the radially inner side R1 of the rotor shaft 12b. The output shaft 32 is connected to the second carrier CR2 and the connecting member 31 so as to rotate with the second carrier CR2 and the connecting member 31. In the example shown in FIG. 1, the output shaft 32 is formed integrally with the second carrier CR2. The output shaft 32 is inserted into the connecting member 31 from the first side L1 in the axial direction so that the output shaft 32 is located in the radially inner side R1 of the connecting member 31. In this state, the connecting member 31 and the output shaft 32 are connected to each other by spline engagement.

In the present embodiment, a first oil passage 81 is formed inside the output shaft 32. The first oil passage 81 includes an axial oil passage 81a, a first radial oil passage 81b, a second radial oil passage 81c, and a third radial oil passage 81d.

The axial oil passage 81a is formed so as to extend in the axial direction L inside the output shaft 32. The first radial oil passage 81b, the second radial oil passage 81c, and the third radial oil passage 81d are formed so as to extend in the radial direction R to connect the axial oil passage 81a with the outer peripheral surface of the output shaft 32.

The first radial oil passage 81b is located so as to overlap the second output member 3 as viewed in the radial direction along the radial direction R. In the present embodiment, a plurality of first radial oil passages 81b is arranged spaced apart from each other in the circumferential direction C.

The second radial oil passage 81c is located so as not to overlap the second output member 3 but to overlap the rotor shaft 12b as viewed in the radial direction along the radial direction R. In the present embodiment, a plurality of second radial oil passages 81c is arranged spaced apart from each other in the axial direction L and the circumferential direction C.

The third radial oil passage 81d is located so as to overlap the revolution trajectory of the second pinion gear PG2 of the planetary gear mechanism 4 as viewed in the radial direction along the radial direction R. In the present embodiment, a plurality of third radial oil passages 81d is arranged spaced apart from each other in the axial direction L and the circumferential direction C.

In the present embodiment, a second oil passage 82 is formed in the second side wall portion 93 of the case 9. The second oil passage 82 is formed so as to extend in the radial direction R. In the example shown in FIG. 1, the second oil passage 82 is formed so as to pass between the second bearing B2 and the fourth bearing B4 in the axial direction L.

In the present embodiment, the second side wall portion 93 includes a thick wall portion 93a having a relatively large thickness (dimension in the axial direction L) and a thin wall portion 93b having a relatively small thickness. A partial region in the circumferential direction C of the second side wall portion 93 is the thin wall portion 93b, and the remaining region is the thick wall portion 93a. The second oil passage 82 is formed in the thick wall portion 93a.

In the present embodiment, a third oil passage 83 is formed in the connecting member 31. The third oil passage 83 is formed so as to extend from the inner peripheral surface to the outer peripheral surface of the connecting member 31 to allow the first radial oil passage 81b and the second oil passage 82 to communicate with each other.

In the present embodiment, oil discharged from a hydraulic pump (not shown) provided in the vehicle drive device 100 is supplied to the second oil passage 82. The oil supplied to the second oil passage 82 is supplied to the axial oil passage 81a through the third oil passage 83 and the first radial oil passage 81b. The oil supplied to the axial oil passage 81a is supplied to the inner peripheral surface of the rotor shaft 12b through the second radial oil passage 81c. The oil supplied to the axial oil passage 81a is also supplied to the second pinion gear PG2 of the planetary gear mechanism 4 etc. through the third radial oil passage 81d. The oil supplied to the axial oil passage 81a is also supplied to the third pinion gear PG3, the fourth pinion gear PG4, etc. through a fourth oil passage 84 formed in the second carrier CR2 of the output differential gear mechanism 5.

In the present embodiment, the second oil passage 82 is located on the opposite side of the stator 11 of the rotating electrical machine 1 from the planetary gear mechanism 4 and the output differential gear mechanism 5 in the axial direction L. That is, the planetary gear mechanism 4 and the output differential gear mechanism 5 are located on the first side L1 in the axial direction with respect to the stator 11. The second oil passage 82 is located on the second side L2 in the axial direction with respect to the stator 11. In the example shown in FIG. 1, the second oil passage 82 is located on the second side L2 in the axial direction with respect to the second coil end portion 11d of the stator 11.

As shown in FIG. 1, in the present embodiment, the rotating electrical machine 1 further includes a terminal portion 14 for connecting the coil 11b of the stator 11 to a power supply (not shown). The terminal portion 14 is disposed so as to protrude from the stator 11 toward the second side L2 in the axial direction. In the present embodiment, the terminal portion 14 is formed as a part in the circumferential direction C of the second coil end portion 11d that protrudes toward the second side L2 in the axial direction. For example, when the rotating electrical machine 1 is driven by a three-phase alternating current, the terminal portion 14 includes three-phase terminals electrically connected to three-phase output terminals of an inverter.

In the present embodiment, the region in the circumferential direction C where the terminal portion 14 is located does not overlap the region in the circumferential direction C where the second oil passage 82 is located. The region in the axial direction L where the terminal portion 14 is located overlaps the region in the axial direction L where the second oil passage 82 is located. In this example, the terminal portion 14 is disposed so as not to overlap the thick wall portion 93a of the second side wall portion 93 but to overlap the thin wall portion 93b of the second side wall portion 93 as viewed in the axial direction along the axial direction L. The terminal portion 14 is disposed so as to overlap the thick wall portion 93a where the second oil passage 82 is formed, as viewed in the radial direction along the radial direction R.

As described above, in the present embodiment, the rotating electrical machine 1 includes: the stator 11 including the coil 11b; and the terminal portion 14 for connecting the coil 11b to the power supply. The planetary gear mechanism 4 and the output differential gear mechanism 5 are disposed on the first side L1 in the axial direction with respect to the stator 11. The terminal portion 14 is disposed so as to protrude from the stator 11 toward the second side L2 in the axial direction. The second oil passage 82 extending in the radial direction R is located on the second side L2 in the axial direction with respect to the stator 11. The region in the circumferential direction C where the second oil passage 82 is located and the region in the circumferential direction C where the terminal portion 14 is located do not overlap each other. The region in the axial direction L where the second oil passage 82 is located and the region in the axial direction L where the terminal portion 14 is located overlap each other.

According to this configuration, the dimension in the axial direction L of the vehicle drive device 100 can be reduced compared to a configuration in which the second oil passage 82 and the terminal portion 14 are located offset from each other in the axial direction L.

Figure 3:
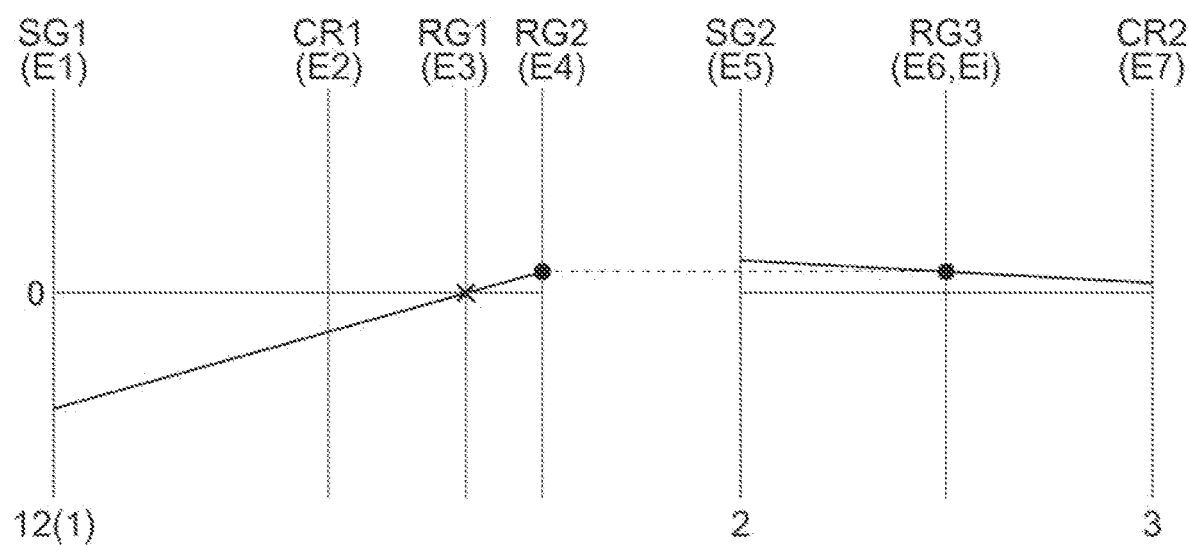
FIG. 3 is a speed diagram of a planetary gear mechanism and an output differential gear mechanism according to the first embodiment.

FIG. 3 is a speed diagram of the planetary gear mechanism 4 and the output differential gear mechanism 5 according to the present embodiment. In the speed diagram of FIG. 3, the vertical lines correspond to the rotational speeds of the rotating elements of the planetary gear mechanism 4 and the output differential gear mechanism 5. The plurality of vertical lines arranged in parallel corresponds to the rotating elements of the planetary gear mechanism 4 and the output differential gear mechanism 5. In the speed diagram of FIG. 3, the sings shown above the plurality of vertical lines are the signs of the corresponding rotating elements. The signs shown below some of the vertical lines are the signs of the elements that rotate with the rotating elements denoted by the signs shown above the vertical lines. In the speed diagram of FIG. 3, black circles on some of the vertical lines indicate that the rotating elements corresponding to those vertical lines rotate together. In the speed diagram of FIG. 3, a cross mark on a vertical line indicates that the rotating element corresponding to this vertical line is fixed to the case 9 that is the non-rotating member NR.

As shown in FIG. 3, in the present embodiment, rotation transmitted from the rotor 12 of the rotating electrical machine 1 to the first sun gear SG1 is reversed and reduced in speed in the planetary gear mechanism 4, and transmitted to the second ring gear RG2. As a result, the torque of the rotating electrical machine 1 is amplified and transmitted to second ring gear RG2. The rotation and torque transmitted from the second ring gear RG2 to the third ring gear RG3 are distributed to the first output member 2 connected to the second sun gear SG2 and the second output member 3 connected to the second carrier CR2 by the output differential gear mechanism 5.

2. Second Embodiment

Hereinafter, the vehicle drive device 100 according to a second embodiment will be described with reference to FIGS. 4 to 6. This embodiment is different from the first embodiment in the configuration of the case 9 and the configuration of the output differential gear mechanism 5. The differences from the first embodiment will mainly be described below. Points that are not particularly described are the same as in the first embodiment.

Figure 4:
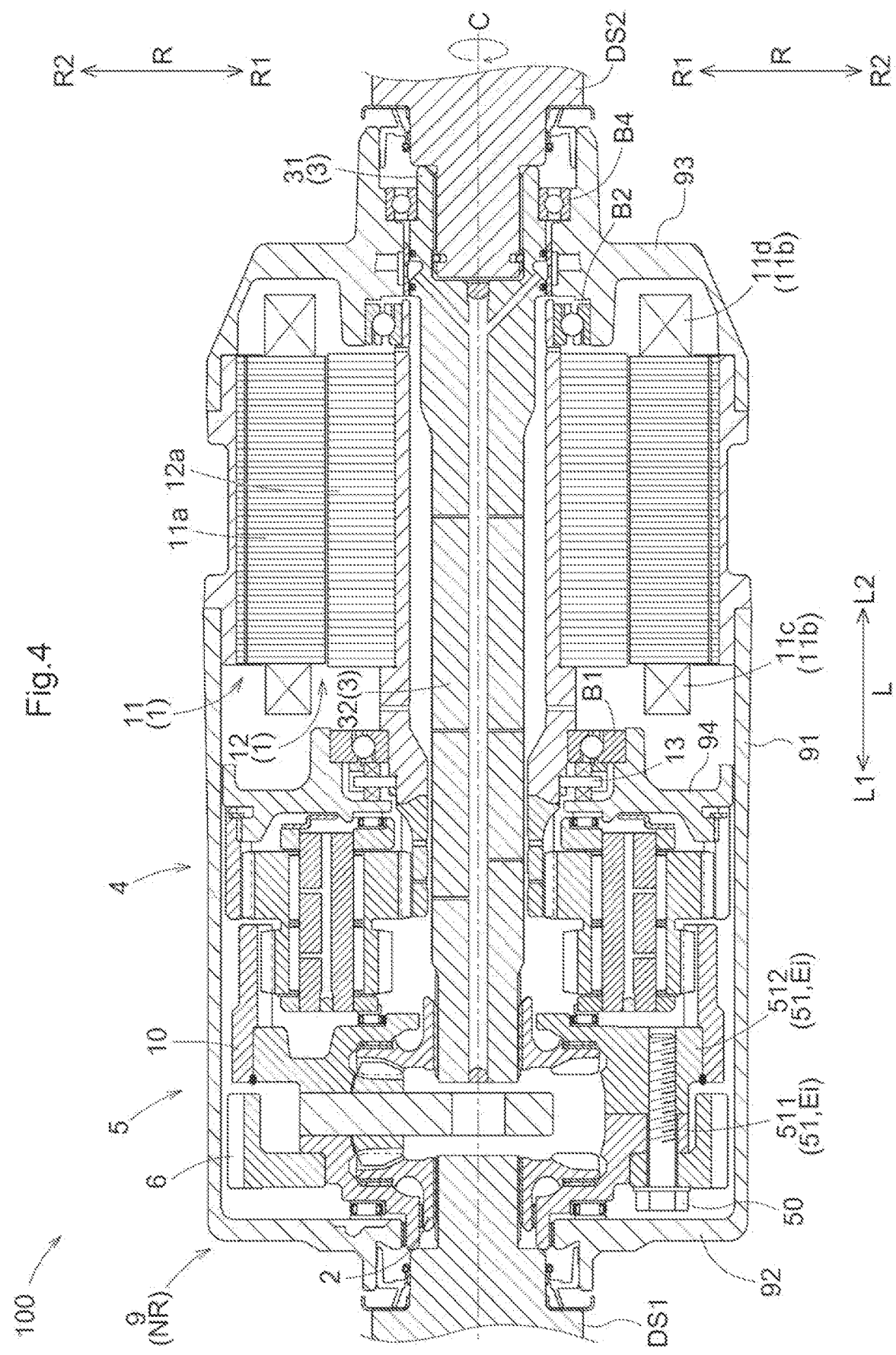
FIG. 4 is a sectional view taken along an axial direction of a vehicle drive device according to a second embodiment.

As shown in FIG. 4, in the present embodiment, the case 9 does not include the cover portion 95. Therefore, the fifth bearing B5 that supports the second output member 3 with respect to the cover portion 95 is not provided in the second embodiment.

Figure 6:
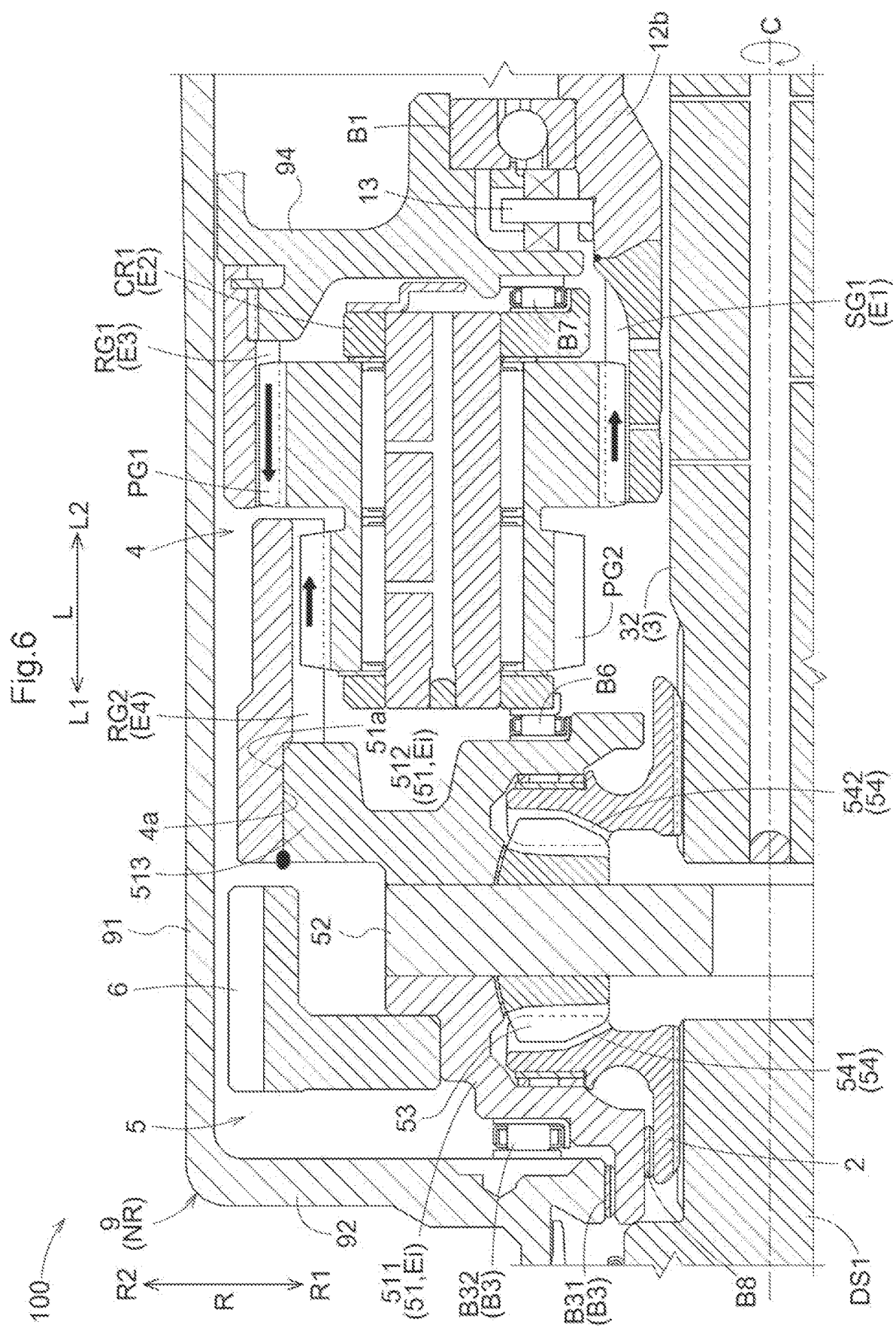
FIG. 6 is a partial enlarged sectional view taken along the axial direction of the vehicle drive device according to the second embodiment.

As shown in FIG. 6, in the present embodiment, the output differential gear mechanism 5 includes a differential case 51, a shaft member 52, a pinion gear 53, and a pair of side gears 54.

The differential case 51 is formed so as to house the pinion gear 53 and the pair of side gears 54. In the present embodiment, the differential case 51 is connected to the fourth rotating element E4 of the planetary gear mechanism 4 so as to rotate with the fourth rotating element E4. That is, in the present embodiment, the differential case 51 is the input element Ei.

The shaft member 52 is formed so as to extend in the radial direction R. The shaft member 52 is supported by the differential case 51 so as to rotate with the differential case 51. In the present embodiment, a plurality of shaft members 52 is arranged in a distributed manner in the circumferential direction C so as to extend in the radial direction R (for example, four shaft members 52 are arranged in a cross shape as viewed in the axial direction along the axial direction L).

The pinion gear 53 is rotatably supported by the shaft member 52. The pinion gear 53 is configured so as to be rotatable (rotatable) about the shaft member 52 and rotatable (revolvable) about the rotation axis of the differential case 51 (see long dashed short dashed line in FIG. 6). In the present embodiment, a pinion gear 53 is mounted on each of the plurality of shaft members 52 arranged in a distributed manner in the circumferential direction C. The pinion gear 53 corresponds to the "first bevel gear."

The pair of side gears 54 is disposed on both sides in the axial direction L of the shaft member 52. The pair of side gears 54 meshes with the pinion gear 53. The side gear 54 corresponds to the "second bevel gear." In the following description, of the pair of side gears 54, the side gear 54 on the first side L1 in the axial direction will be referred to as "first side gear 541," and the side gear 54 on the second side L2 in the axial direction will be referred to as "second side gear 542."

In the present embodiment, the first side gear 541 is connected via the first output member 2 to the first drive shaft DS1 drivingly connected to the first wheel W1 so that the first side gear 541 rotates with the first drive shaft DS1. In the present embodiment, the first output member 2 is disposed so as to extend from the first side gear 541 toward the first side L1 in the axial direction. The first output member 2 is supported so as to be rotatable relative to the differential case 51 via an eighth bearing B8. In the example shown in FIG. 6, the first side gear 541 and the first output member 2 are formed integrally. The first output member 2 is supported so as to be rotatable relative to a first member 511 of the differential case 51 via the eighth bearing B8. The eighth bearing B8 is a plain bearing. In the example shown in FIG. 6, the first output member 2 has a tubular shape having an axis in the axial direction L. The first drive shaft DS1 is inserted into the first output member 2 from the first side L1 in the axial direction so as to be located in the radially inner side R1 of the first output member 2, and the first drive shaft DS1 and the first output member 2 are connected to each other by spline engagement.

Figure 5:
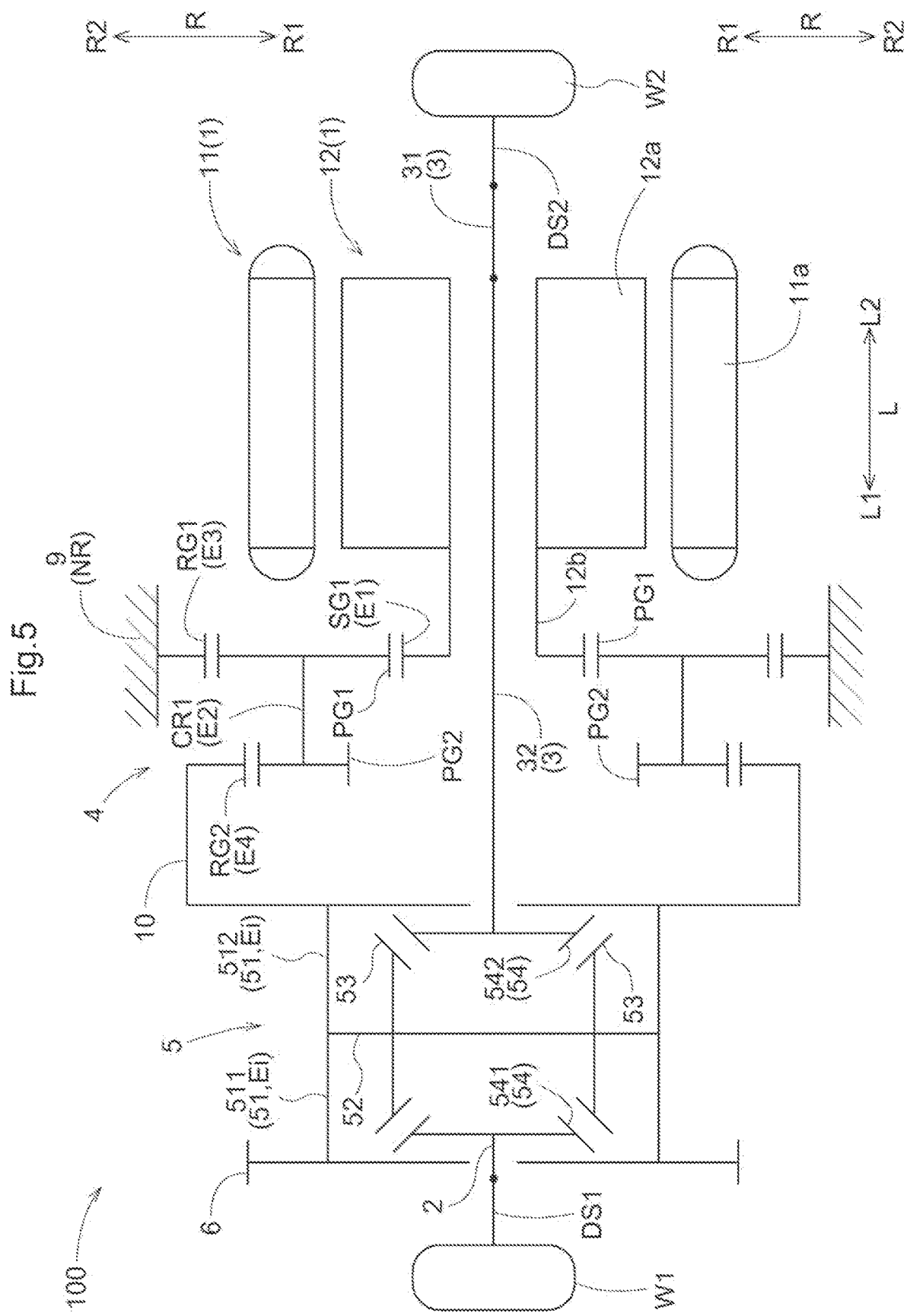
FIG. 5 is a skeleton diagram of the vehicle drive device according to the second embodiment.

As shown in FIGS. 4 to 6, in the present embodiment, the second side gear 542 is connected via the output shaft 32 and the connecting member 31 to the second drive shaft DS2 drivingly connected to the second wheel W2 so that the second side gear 542 rotates with the second drive shaft DS2. In the example shown in FIG. 6, the output shaft 32 is inserted from the second side L2 in the axial direction so as to be located inside the second side gear 542 in the radial direction R, and the output shaft 32 and the second side gear 542 are connected to each other by spline engagement. In the example shown in FIG. 4, the connecting member 31 and the output shaft 32 are formed integrally.

As described above, in the present embodiment, the output differential gear mechanism 5 includes: the differential case 51; the shaft member 52 disposed so as to be supported by the differential case 51 and extend in the radial direction R; the pinion gear 53 housed in the differential case 51 and rotatably supported by the shaft member 52; and the pair of side gears 54 housed in the differential case 51 and meshing with the pinion gear 53 on both sides in the axial direction L with respect to the shaft member 52. The differential case 51 is the input element Ei.

According to this configuration, the output differential gear mechanism 5 can be formed as a bevel gear type differential gear mechanism. The differential case 51 housing the pinion gear 53 and the side gears 54 is the input element Ei connected to the fourth rotating element E4, which facilitates an increase in design flexibility of the connection structure between the planetary gear mechanism 4 and the output differential gear mechanism 5.

As shown in FIG. 6, in the present embodiment, the differential case 51 includes the first member 511 and a second member 512. The first member 511 and the second member 512 are configured so as to be joined to each other in the axial direction L. In the present embodiment, the first member 511 is disposed on the first side L1 in the axial direction with respect to the shaft member 52, and the second member 512 is disposed on the second side L2 in the axial direction with respect to the shaft member 52. The first member 511 and the second member 512 support the shaft member 52 so as to sandwich it therebetween in the axial direction L.

As shown in FIG. 6, the tubular member 10 is not provided in the present embodiment. As shown in FIG. 4, the parking gear 6, the first member 511, and the second member 512 are fastened together in the axial direction L by a bolt 50. In the example shown in FIG. 4, with the parking gear 6 abutting on the first member 511 from the first side L1 in the axial direction, the bolt 50 is tightened through the parking gear 6, the first member 511, and the second member 512 from the first side L1 in the axial direction in the region in the circumferential direction C of the differential case 51 where the shaft member 52 is not located.

As described above, in the present embodiment, the vehicle drive device 100 further includes the parking gear 6 and the parking lock mechanism 7 that selectively engages with the parking gear 6. The differential case 51 includes the first member 511 and the second member 512 that are joined to each other in the axial direction L. The parking gear 6, the first member 511, and the second member 512 are fastened together in the axial direction L by the bolt 50.

According to this configuration, the differential case 51 includes the first member 511 and the second member 512 that are joined to each other in the axial direction L. This facilitates the work of attaching the shaft member 52, the pinion gear 53, and the side gears 54 to the differential case 51.

According to this configuration, the parking gear 6, the first member 511, and the second member 512 are fastened together in the axial direction L by the bolt 50. As a result, the number of components of the vehicle drive device 100 can be reduced compared to a configuration in which connection of the parking gear 6 to the differential case 51 and connection between the first member 511 and the second member 512 are performed using separate connecting members.

As shown in FIG. 6, in the present embodiment, the differential case 51 that is the input element Ei of the output differential gear mechanism 5 is supported so as to be rotatable with respect to the first side wall portion 92 of the case 9 via the third bearing B3. In the present embodiment, the third bearing B3 includes a radial bearing B31 and a thrust bearing B32. The first side wall portion 92 corresponds to the "second support wall portion" disposed on the first side L1 in the axial direction with respect to the output differential gear mechanism 5.

In the present embodiment, the radial bearing B31 is disposed between the first member 511 and the first side wall portion 92 in the radial direction R. The radial bearing B31 supports the first member 511 in the radial direction R. The radial bearing B31 is disposed on the first side L1 in the axial direction with respect to the plurality of gears constituting the output differential gear mechanism 5 (in this example, the plurality of pinion gears 53 and the pair of side gears 54). In the present embodiment, the radial bearing B31 is a plain bearing or a needle roller bearing. In the example shown in FIG. 6, the radial bearing B31 is a plain bearing. As described above, the radial bearing B31 corresponds to the "second support bearing" disposed on the first side L1 in the axial direction with respect to the plurality of gears constituting the output differential gear mechanism 5 and rotatably supporting the input element Ei.

In the present embodiment, the thrust bearing B32 is disposed between the first member 511 and the first side wall portion 92 in the axial direction L. The thrust bearing B32 supports the first member 511 in the axial direction L. The thrust bearing B32 is disposed on the first side L1 in the axial direction with respect to the plurality of gears constituting the output differential gear mechanism 5 (in this example, the plurality of pinion gears 53 and the pair of side gears 54). In the example shown in FIG. 6, the thrust bearing B32 is disposed on the second side L2 in the axial direction and the radially outer side R2 with respect to the radial bearing B31. In the example shown in FIG. 6, the thrust bearing B32 is a needle roller bearing.

In the present embodiment, the differential case 51 is supported so as to be rotatable with respect to the partition wall portion 94 of the case 9 via a sixth bearing B6 and a seventh bearing B7.

The sixth bearing B6 is disposed between the second member 512 and a part of the first carrier CR1 located on the first side L1 in the axial direction with respect to the second pinion gear PG2 in the axial direction L. The seventh bearing B7 is disposed between a part of the first carrier CR1 located on the second side L2 in the axial direction with respect to the first pinion gear PG1 and the partition wall portion 94 in the axial direction L. The second member 512 is thus supported in the axial direction L with respect to the partition wall portion 94 via the sixth bearing B6 and the seventh bearing B7. In the example shown in FIG. 6, each of the sixth bearing B6 and the seventh bearing B7 is a needle roller bearing.

As described above, in the present embodiment, the differential case 51 is supported in the radial direction R by the radial bearing B31, and is also supported in the axial direction L by the thrust bearing B32, the sixth bearing B6, and the seventh bearing B7. That is, in the present embodiment, the radial bearing B31 is the only bearing that supports the output differential gear mechanism 5 in the radial direction R.

As described above, in the present embodiment, the planetary gear mechanism 4 is disposed on the first side L1 in the axial direction with respect to the rotor 12. The output differential gear mechanism 5 is disposed on the first side L1 in the axial direction with respect to the planetary gear mechanism 4. The input element Ei of the output differential gear mechanism 5 is supported in the radial direction R with respect to the case 9 via the radial bearing B31 that is the second support bearing disposed on the first side L1 in the axial direction with respect to the plurality of gears constituting the output differential gear mechanism 5.

According to this configuration, on the first side L1 in the axial direction with respect to the plurality of gears constituting the output differential gear mechanism 5, the input element Ei of the output differential gear mechanism 5 can be supported in the radial direction R by the radial bearing B31 that is the second support bearing. On the second side L2 in the axial direction with respect to the plurality of gears constituting of the output differential gear mechanism 5, the input element Ei of the output differential gear mechanism 5 can be supported in the radial direction R using the alignment function (self-alignment function) of the planetary gear mechanism 4, as described above. As a result, it is possible to implement a configuration in which the input element Ei of the output differential gear mechanism 5 is supported in the radial direction R only by the radial bearing B31 disposed on the first side L1 in the axial direction with respect to the plurality of gears constituting the output differential gear mechanism 5. This facilitates reduction in size and cost of the vehicle drive device 100 compared to a configuration in which the input element Ei is supported in the radial direction R by a plurality of bearings disposed on both sides in the axial direction L with respect to the plurality of gears constituting the output differential gear mechanism 5.

In the present embodiment, the case 9 includes the first side wall portion 92 that is the second support wall portion disposed on the first side L1 in the axial direction with respect to the output differential gear mechanism 5. The input element Ei is supported in the radial direction R by the plain bearing or needle roller bearing disposed between the input element Ei and the first side wall portion 92 in the radial direction R, and is supported in the axial direction L by the thrust bearing B32 disposed between the input element Ei and the first side wall portion 92 in the axial direction L.

According to this configuration, it is possible to ensure that the input element Ei has high support stiffness while reducing an increase in size of the vehicle drive device 100, compared to, for example, a configuration in which the input element Ei is supported in both the radial direction R and the axial direction L by ball bearings.

As shown in FIG. 6, in the present embodiment, the differential case 51 that is the input element Ei of the output differential gear mechanism 5 includes a connecting portion 513. In the present embodiment, the connecting portion 513 is formed so as to protrude from the second member 512 toward the radially outer side R2. The connecting portion 513 is formed integrally with the second ring gear RG2. In the present application, "formed integrally" includes a plurality of elements being configured as a single-piece member, and a plurality of elements being inseparably connected by welding etc. Note that "connected so as to rotate together" includes a plurality of elements being separably connected such as by spline engagement.

In the present embodiment, the differential case 51 that is the input element Ei of the output differential gear mechanism 5 includes a fitting outer peripheral surface 51a facing toward the radially outer side R2. The second ring gear RG2 includes a fitting inner peripheral surface 4a facing toward the radially inner side R1. The fitting inner peripheral surface 4a and the fitting outer peripheral surface 51a are fitted together so as to contact each other in the radial direction R. In the example shown in FIG. 6, the fitting outer peripheral surface 51a is formed on the outer peripheral surface of the connecting portion 513 of the differential case 51. The fitting inner peripheral surface 4a is formed on the inner peripheral surface of a part of the second ring gear RG2 that protrudes from a toothed part of the second ring gear RG2 toward the first side L1 in the axial direction.

In the present embodiment, the second ring gear RG2 and the input element Ei are fixed to each other by welding with the fitting inner peripheral surface 4a and the fitting outer peripheral surface 51a fitted together. In the example shown in FIG. 6, the connecting portion 513 of the differential case 51 and the second ring gear RG2 are welded together from the first side L1 in the axial direction with the connecting portion 513 fitted in the second ring gear RG2 from the first side L1 in the axial direction.

As described above, in the present embodiment, the second ring gear RG2 includes the fitting inner peripheral surface 4a facing toward the radially inner side R1, and the input element Ei includes the fitting outer peripheral surface 51a facing toward the radially outer side R2. The second ring gear RG2 and the input element Ei are fixed to each other by welding with the fitting inner peripheral surface 4a and the fitting outer peripheral surface 51a fitted together so as to contact each other in the radial direction R.

According to this configuration, it is possible to easily implement a configuration in which the second ring gear RG2 and the input element Ei are connected such that their relative movement in the radial direction R is restricted.

In the present embodiment, the first pinion gear PG1 and the second pinion gear PG2 are helical gears. The direction of the thrust load the first pinion gear PG1 receives from the first sun gear SG1 and the direction of the thrust load the second pinion gear PG2 receives from the second ring gear RG2 are opposite to the direction of the thrust load the first pinion gear PG1 receives from the first ring gear RG1. In the present embodiment, the helical directions of the first pinion gear PG1 and the second pinion gear PG2 are set so that the sum of the magnitude of the thrust load the first pinion gear PG1 receives from the first sun gear SG1 and the magnitude of the thrust load the second pinion gear PG2 receives from the second ring gear RG2 has a value that is the same as or close to the magnitude of the thrust load the first pinion gear PG1 receives from the first ring gear RG1. In other words, the helical directions of the first pinion gear PG1 and the second pinion gear PG2 are set so that the resultant force of the thrust loads applied from the first sun gear SG1, the first ring gear RG1, and the second ring gear RG2 to the first pinion gear PG1 and second pinion gear PG2 that rotate together is zero or has a value close to zero. As used herein, the "helical direction" of each pinion gear refers to the direction of the helix angle (twist direction) of the teeth of each pinion gear. In FIG. 6, the black arrow shown on the first pinion gear PG1 next to the first sun gear SG1 represents the direction of the thrust load the first pinion gear PG1 receives from the first sun gear SG1. The black arrow shown on the first pinion gear PG1 next to the first ring gear RG1 represents the direction of the thrust load the first pinion gear PG1 receives from the first ring gear RG1 The black arrow shown on the second pinion gear PG2 next to the second ring gear RG2 represents the direction of the thrust load the second pinion gear PG2 receives from the second ring gear RG2.

According to this configuration, the thrust load the first pinion gear PG1 receives from the first sun gear SG1 and the thrust load the second pinion gear PG2 receives from the second ring gear RG2, and the thrust load the first pinion gear PG1 receives from the first ring gear RG1 can cancel each other out. This can avoid an excessively large thrust load being applied to a bearing (in this example, the sixth bearing B6 and the seventh bearing B7) supporting the first carrier CR1 that rotatably supports the first pinion gear PG1 and the second pinion gear PG2.

3. Third Embodiment

Hereinafter, the vehicle drive device 100 according to a third embodiment will be described with reference to FIG. 7. This embodiment is different from the second embodiment in the support structure for the differential case 51 of the output differential gear mechanism 5. The differences from the second embodiment will mainly be described below. Points that are not particularly described are the same as in the second embodiment.

Figure 7:
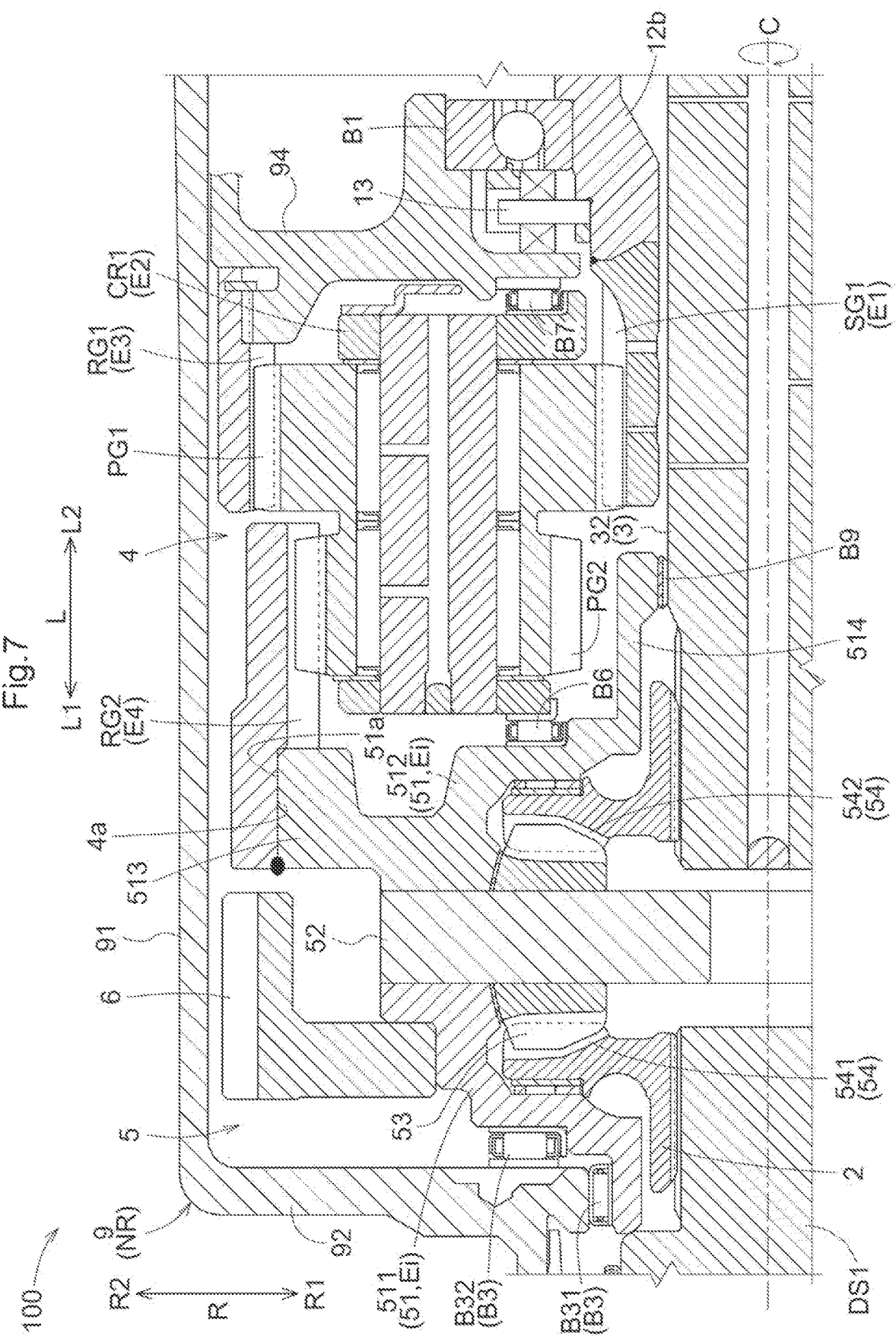
FIG. 7 is a partial enlarged sectional view taken along an axial direction of a vehicle drive device according to a third embodiment.

As shown in FIG. 7, the eighth bearing B8 is not provided in the present embodiment. That is, in the present embodiment, the differential case 51 is not supported with respect to the first output member 2, but is supported with respect to the first side wall portion 92 of the case 9 via the radial bearing B31. In the example shown in FIG. 7, the radial bearing B31 is a needle roller bearing. Clearance is formed between the first member 511 of the differential case 51 and the first output member 2 in the radial direction R.

In the present embodiment, the differential case 51 includes a differential case target portion 514. The differential case target portion 514 corresponds to the "part of the differential case 51 that is located on the second side L2 in the axial direction with respect to the middle position in the axial direction L of the output differential gear mechanism 5." In the present embodiment, the "middle position in the axial direction L of the output differential gear mechanism 5" is the position in the axial direction L of the axis of the shaft member 52. In the present embodiment, the differential case target portion 514 is formed so as to protrude from the second member 512 of the differential case 51 toward the second side L2 in the axial direction. The differential case target portion 514 is supported so as to be rotatable relative to the second output member 3 via a ninth bearing B9.

In the present embodiment, the second output member 3 is disposed so as to extend through the radially inner side R1 of the differential case target portion 514 in the axial direction L. The ninth bearing B9 is disposed between the inner peripheral surface of the differential case target portion 514 and the outer peripheral surface of the second output member 3. In the example shown in FIG. 7, the output shaft 32 of the second output member 3 is disposed so as to extend through the radially inner side R1 of the differential case target portion 514 in the axial direction L. The ninth bearing B9 is disposed between the inner peripheral surface of the differential case target portion 514 and the outer peripheral surface of the output shaft 32. The ninth bearing B9 corresponds to the "third support bearing." The ninth bearing B9 may not be provided in the configuration in which the differential case 51 includes the differential case target portion 514.

As described above, in the present embodiment, the first output member 2 is disposed on the first side L1 in the axial direction with respect to the second output member 3. The differential case target portion 514 is a part of the differential case 51 that is located on the second side L2 in the axial direction with respect to the middle position in the axial direction L of the output differential gear mechanism 5. The second output member 3 is disposed so as to extend through the radially inner side R1 of the differential case target portion 514 in the axial direction L. The ninth bearing B9 that is the third support bearing is disposed between the inner peripheral surface of the differential case target portion 514 and the outer peripheral surface of the second output member 3.

According to this configuration, the differential case target portion 514 that is a part of the differential case 51 that is located on the second side L2 in the axial direction with respect to the middle position in the axial direction L of the output differential gear mechanism 5 is supported by the ninth bearing B9. This can increase support accuracy of the differential case 51.

4. Other Embodiments (1) In the above embodiments, the configuration in which the parking gear 6 is disposed so as to overlap the output differential gear mechanism 5 as viewed in the radial direction along the radial direction R is described as an example. However, the present disclosure is not limited to such a configuration, and the parking gear 6 may be disposed on one side in the axial direction L with respect to the output differential gear mechanism 5.

(2) In the first embodiment, the configuration in which the second ring gear RG2, the third ring gear RG3, and the parking gear 6 are formed on the same tubular member 10 is described as an example. However, the present disclosure is not limited to such a configuration, and these gears may be formed as a plurality of members. For example, the second ring gear RG2, the third ring gear RG3, and the parking gear 6 may be formed as separate members and connected to each other so as to rotate together.

(3) In the first embodiment, the following configuration is described as an example: the region in the circumferential direction C where the second oil passage 82 is located and the region in the circumferential direction C where the terminal portion 14 is located do not overlap each other, and the region in the axial direction L where the second oil passage 82 is located and the region in the axial direction L where the terminal portion 14 is located overlap each other. However, the present disclosure is not limited to such a configuration, and the second oil passage 82 and the terminal portion 14 may be located offset from each other in the axial direction L.

(4) In the second embodiment, the following configuration is described as an example: the differential case 51 is supported so as to be rotatable relative to the first output member 2 via the eighth bearing B8, and is supported so as to be rotatable with respect to the case 9 via the radial bearing B31. However, the present disclosure is not limited to such a configuration. For example, the present disclosure may have a configuration in which the first output member 2 is supported so as to be rotatable with respect to the case 9 via the radial bearing B31 and the differential case 51 is supported so as to be rotatable relative to the first output member 2 via the eighth bearing B8, namely a configuration in which the differential case 51 is indirectly supported by the case 9 via the first output member 2.

(5) In the second and third embodiments, the following configuration is described as an example: the differential case 51 of the output differential gear mechanism 5 includes the first member 511 and the second member 512 that are joined to each other in the axial direction L, and the parking gear 6, the first member 511, and the second member 512 are fastened together in the axial direction L by the bolt 50. However, the present disclosure is not limited to such a configuration. For example, connection of the parking gear 6 to the differential case 51 and connection between the first member 511 and the second member 512 may be performed using separate connecting members. Alternatively, the differential case 51 may not include the first member 511 and the second member 512, and may be configured as a single member.

(6) In the second and third embodiments, the following configuration is described as an example: the input element Ei is supported in the radial direction R by the radial bearing B31 that is a plain bearing disposed between the input element Ei and the first side wall portion 92 in the radial direction R, and is supported in the axial direction L by the thrust bearing B32 disposed between the input element Ei and the first side wall portion 92 in the axial direction L. However, the present disclosure is not limited to such a configuration. For example, the input element Ei may be supported in both the radial direction R and the axial direction L by ball bearings.

(7) The configuration disclosed in any of the above embodiments can be applied in combination with any of the configurations disclosed in the other embodiments as long as no contradiction arises. Regarding the other configurations, the embodiments disclosed herein are merely illustrative in all respects. Therefore, various modifications can be made as appropriate without departing from the spirit and scope of the present disclosure.

5. Overview of Embodiments

Hereinafter, an overview of the vehicle drive device (100) described above will be provided.

The vehicle drive device (100) includes: a rotating electrical machine (1) including a rotor (12); a first output member (2) drivingly connected to a first wheel (W1); a second output member (3) drivingly connected to a second wheel (W2); a planetary gear mechanism (4) that reduces a speed of rotation of the rotor (12); an output differential gear mechanism (5) that includes an input element (Ei) and that distributes rotation transmitted from the planetary gear mechanism (4) to the input element (Ei) to the first output member (2) and the second output member (3); and a case (9) housing the rotating electrical machine (1), the planetary gear mechanism (4), and the output differential gear mechanism (5). The rotating electrical machine (I), the first output member (2), the second output member (3), the planetary gear mechanism (4), and the output differential gear mechanism (5) are disposed coaxially. The planetary gear mechanism (4) includes a first rotating element (E1), a second rotating element (E2), a third rotating element (E3), and a fourth rotating element (E4), and is configured in such a manner that rotational speeds of the first to fourth rotating elements are in the order of the first rotating element (E1), the second rotating element (E2), the third rotating element (E3), and the fourth rotating element (E4). The first rotating element (E1) is a first sun gear (SG1) connected to the rotor (12) so as to rotate with the rotor (12). The third rotating element (E3) is a first ring gear (RG1) connected to the case (9). The fourth rotating element (E4) is a second ring gear (RG2) connected to the input element (Ei) so as to rotate with the input element (Ei). The second rotating element (E2) is a first carrier (CR1) rotatably supporting a first pinion gear (PG1) and a second pinion gear (PG2) that rotate together. The first pinion gear (PG1) meshes with the first sun gear (SG1) and the first ring gear (RG1). The second pinion gear (PG2) has a smaller diameter than the first pinion gear (PG1) and meshes with the second ring gear (RG2). The first sun gear (SG1) is supported in a radial direction (R) with respect to the case (9) via a first support bearing (B1), and the second ring gear (RG2) and the input element (E1) are connected in such a manner that relative movement between the second ring gear (RG2) and the input element (Ei) in the radial direction (R) is restricted, the radial direction (R) being a direction perpendicular to a rotation axis of the rotor (12).

According to this configuration, the first rotating element (E1) of the planetary gear mechanism (4) is connected to the rotor (12). The third rotating element (E3) of the planetary gear mechanism (4) is connected to the case (9), and the fourth rotating element (E4) of the planetary gear mechanism (4) is connected to the input element (Ei) of the output differential gear mechanism (5). Each of the third rotating element (E3) and the fourth rotating element (E4) of the planetary gear mechanism (4) is a ring gear. It is therefore easy to ensure that the planetary gear mechanism (4) functioning as a speed reducer that reduces the speed of rotation of the rotor (12) and transmits the resultant rotation to the output differential gear mechanism (5) has a high reduction ratio (e.g., 17 to 22).

According to this configuration, the fourth rotating element (E4) connected to the input element (Ei) of the output differential gear mechanism (5) is a ring gear. It is therefore easy to dispose the planetary gear mechanism (4) close to the output differential gear mechanism (5) in the axial direction (L) while reducing the dimension in the radial direction (R) of the planetary gear mechanism (4), compared to a configuration in which the rotating element connected to the input element (Ei) of the output differential gear mechanism (5) is a sun gear or a carrier.

According to this configuration, the third rotating element (E3) connected to the case (9) is a ring gear. It is therefore easy to implement a configuration in which a support member etc. extending in the radial direction (R) and required when a sun gear or a carrier is connected to the case (9) can be omitted. This facilitates reduction in dimension in the axial direction (L) of the vehicle drive device (100).

According to this configuration, the first sun gear (SG1) that is the first rotating element (E1) of the planetary gear mechanism (4) is supported in the radial direction (R) with respect to the case (9) via the first support bearing (B1). The second ring gear (RG2) that is the fourth rotating element (E4) of the planetary gear mechanism (4) and the input element (Ei) of the output differential gear mechanism (5) are connected such that their relative movement in the radial direction (R) is restricted. The input element (Ei) of the output differential gear mechanism (5) can therefore be supported in the radial direction (R) using the alignment function (self-alignment function) of the planetary gear mechanism (4). As a result, it is possible to appropriately support the output differential gear mechanism (5) while omitting a member such as a bearing that supports the input element (E1) of the output differential gear mechanism (5) in the radial direction (R) with respect to the case (9). This facilitates reduction in size and cost of the vehicle drive device (100).

As described above, this configuration facilitates reduction in size of the vehicle drive device (100) including the planetary gear mechanism (4) for speed reduction and the output differential gear mechanism (5), while ensuring that the planetary gear mechanism (4) has a high reduction ratio and allowing appropriate support of the output differential gear mechanism (5).

It is suitable that the planetary gear mechanism (4) be disposed on a first side (L1) in an axial direction with respect to the rotor (12), the output differential gear mechanism (5) be disposed on the first side (L1) in the axial direction with respect to the planetary gear mechanism (4), and the input element (Ei) be supported in the radial direction (R) with respect to the case (9) via a second support bearing (B31) disposed on the first side (L1) in the axial direction with respect to a plurality of gears constituting the output differential gear mechanism (5), the axial direction (L) being a direction along the rotation axis of the rotor (12), the first side (L1) in the axial direction being one side in the axial direction (L), and a second side (L2) in the axial direction being the other side in the axial direction (L).

According to this configuration, on the first side (L1) in the axial direction with respect to the plurality of gears constituting the output differential gear mechanism (5), the input element (Ei) of the output differential gear mechanism (5) can be supported in the radial direction (R) by the second support bearing (B31). On the second side (L2) in the axial direction with respect to the plurality of gears constituting the output differential gear mechanism (5), the input element (Ei) of the output differential gear mechanism (5) can be supported in the radial direction (R) using the alignment function (self-alignment function) of the planetary gear mechanism (4), as described above. As a result, a configuration can be implemented in which the input element (Ei) of the output differential gear mechanism (5) is supported in the radial direction (R) only by the second support bearing (B31) disposed on the first side (L1) in the axial direction with respect to the plurality of gears constituting the output differential gear mechanism (5). This facilitates reduction in size and cost of the vehicle drive device (100) compared to a configuration in which the input element (Ei) is supported in the radial direction (R) by a plurality of bearings disposed on both sides in the axial direction (L) with respect to the plurality of gears constituting the output differential gear mechanism (5).

In the configuration in which the input element (Ei) is supported in the radial direction (R) with respect to the case (9) via the second support bearing (B31), it is suitable that the output differential gear mechanism (5) include a differential case (51), a shaft member (52) disposed so as to be supported by the differential case (51) and extend in the radial direction (R), a first bevel gear (53) housed in the differential case (51) and rotatably supported by the shaft member (52), and a pair of second bevel gears (54) housed in the differential case (51) and meshing with the first bevel gear (53) on both sides in the axial direction (L) with respect to the shaft member (52), and the differential case (51) be the input element (Ei).

According to this configuration, the output differential gear mechanism (5) can be formed as a bevel gear type differential gear mechanism. The differential case (51) housing the pinion gear (53) and the side gears (54) is the input element (Ei) connected to the fourth rotating element (E4), which facilitates an increase in design flexibility of the connection structure between the planetary gear mechanism 4 and the output differential gear mechanism 5.

In the configuration in which the output differential gear mechanism (5) includes the differential case (51), the shaft member (52), the first bevel gear (53), and the pair of second bevel gears (54), it is suitable that the first output member (2) be disposed on the first side (L1) in the axial direction with respect to the second output member (3), the second output member (3) be disposed so as to extend through an inner side (R1) in the radial direction (R) of a differential case target portion (514) in the axial direction (L), and a third support bearing (B9) be disposed between an inner peripheral surface of the differential case target portion (514) and an outer peripheral surface of the second output member (3), the differential case target portion (514) being a part of the differential case (51) that is located on the second side (L2) in the axial direction with respect to a middle position in the axial direction (L) of the output differential gear mechanism (5).

According to this configuration, the differential case target portion (514) that is a part of the differential case (51) that is located on the second side (12) in the axial direction with respect to the middle position in the axial direction (L) of the output differential gear mechanism (5) is supported by the third support bearing (B9). This can increase support accuracy of the differential case (51).

It is suitable that the output differential gear mechanism (5) be a planetary gear mechanism including a second sun gear (SG2), a second carrier (CR2), and a third ring gear (RG3), the second sun gear (SG2) be connected to the first output member (2) so as to rotate with the first output member (2), the second carrier (CR2) be connected to the second output member (3) so as to rotate with the second output member (3), and the third ring gear (RG3) be the input element (Ei).

According to this configuration, the second output member (3) connected to the second carrier (CR2) can be supported in the radial direction (R) using the alignment function (self-alignment function) of the output differential gear mechanism (5) that is a planetary gear mechanism. As a result, it is possible to appropriately support the second output member (3) while omitting a member such as a bearing that supports the second output member (3) in the radial direction (R) with respect to the case (9). This facilitates reduction in size and cost of the vehicle drive device (100).

It is suitable that the case (9) include a first support wall portion (94) disposed between the rotating electrical machine (1) and the planetary gear mechanism (4) in an axial direction (L), and the first support bearing (B1) be supported by the first support wall portion (94) and be configured to support the first sun gear (SG1) in the radial direction (R) and support the rotor (12) in the radial direction (R), the axial direction (L) being a direction along the rotation axis of the rotor (12).

This configuration facilitates reduction in dimension in the axial direction (L) of the vehicle drive device (100) compared to a configuration in which both a bearing that supports the first sun gear (SG1) in the radial direction (R) and a bearing that supports the rotor (12) in the radial direction (R) are provided.

It is suitable that the second ring gear (RG2) include a fitting inner peripheral surface (4a) facing toward an inner side (R1) in the radial direction (R), the input element (Ei) include a fitting outer peripheral surface (51a) facing toward an outer side (R2) in the radial direction (R), and the second ring gear (RG2) and the input element (E1) be fixed to each other by welding with the fitting inner peripheral surface (4a) and the fitting outer peripheral surface (51a) fitted together so as to contact each other in the radial direction (R).

According to this configuration, it is possible to easily implement a configuration in which the second ring gear (RG2) and the input element (Ei) are connected in such a manner that their relative movement in the radial direction (R) is restricted.

It is suitable that the first pinion gear (PG1) and the second pinion gear (PG2) be helical gears, and a direction of a thrust load the first pinion gear (PG1) receives from the first sun gear (SG1) and a direction of a thrust load the second pinion gear (PG2) receives from the second ring gear (RG2) be opposite to a direction of a thrust load the first pinion gear (PG1) receives from the first ring gear (RG1).

According to this configuration, the thrust load the first pinion gear (PG1) receives from the first sun gear (SG1) and the thrust load the second pinion gear (PG2) receives from the second ring gear (RG2), and the thrust load the first pinion gear (PG1) receives from the first ring gear (RG1) can cancel each other out. This can avoid an excessively large thrust load being applied to a bearing supporting the first carrier (CR1) that rotatably supports the first pinion gear (PG1) and the second pinion gear (PG2).

It is suitable that the case (9) include a second support wall portion (92) disposed on a first side (L1) in an axial direction with respect to the output differential gear mechanism (5), and the input element (Ei) be supported in the radial direction (R) by a plain bearing or a needle roller bearing disposed between the input element (Ei) and the second support wall portion (92) in the radial direction (R), and be supported in the axial direction (L) by a thrust bearing (B32) disposed between the input element (Ei) and the second support wall portion (92) in the axial direction (L), the axial direction (L) being a direction along the rotation axis of the rotor (12), the first side (L1) in the axial direction being one side in the axial direction (L), and a second side (L2) in the axial direction being the other side in the axial direction (L).

According to this configuration, it is possible to ensure that the input element (Ei) has high support stiffness while reducing an increase in size of the vehicle drive device (100), compared to, for example, a configuration in which the input element (Ei) is supported in both the radial direction (R) and the axial direction (L) by ball bearings.

INDUSTRIAL APPLICABILITY

The technique according to the present disclosure can be used for a vehicle drive device including a rotating electrical machine and a planetary gear mechanism.

DESCRIPTION OF THE REFERENCE NUMERALS

100: vehicle drive device, 1: rotating electrical machine, 12: rotor, 2: first output member, 3: second output member, 4: planetary gear mechanism, 5: output differential gear mechanism, 9: case, E1: first rotating element, E2: second rotating element, E3: third rotating element, E4: fourth rotating element, Ei: input element, SG1: first sun gear, CR1: first carrier, PG1: first pinion gear, PG2: second pinion gear, RG1: first ring gear, RG2: second ring gear, W1: first wheel, W2: second wheel

The invention claimed is:

1. A vehicle drive device, comprising:
a rotating electrical machine including a rotor;
a first output member drivingly connected to a first wheel;
a second output member drivingly connected to a second wheel;
a planetary gear mechanism that reduces a speed of rotation of the rotor;
an output differential gear mechanism that includes an input element and that distributes rotation transmitted from the planetary gear mechanism to the input element to the first output member and the second output member; and
a case housing the rotating electrical machine, the planetary gear mechanism, and the output differential gear mechanism, wherein
the rotating electrical machine, the first output member, the second output member, the planetary gear mechanism, and the output differential gear mechanism are disposed coaxially,
the planetary gear mechanism includes a first rotating element, a second rotating element, a third rotating element, and a fourth rotating element, and is configured in such a manner that rotational speeds of the first to fourth rotating elements are in an order of the first rotating element, the second rotating element, the third rotating element, and the fourth rotating element,
the first rotating element is a first sun gear connected to the rotor so as to rotate with the rotor,
the third rotating element is a first ring gear connected to the case,
the fourth rotating element is a second ring gear connected to the input element so as to rotate with the input element,
the second rotating element is a first carrier rotatably supporting a first pinion gear and a second pinion gear that rotate together,
the first pinion gear meshes with the first sun gear and the first ring gear,
the second pinion gear has a smaller diameter than the first pinion gear and meshes with the second ring gear,
the first sun gear is supported in a radial direction with respect to the case via a first support bearing, and the second ring gear and the input element are connected in such a manner that relative movement between the second ring gear and the input element in the radial direction is restricted, the radial direction being a direction perpendicular to a rotation axis of the rotor,
the planetary gear mechanism is disposed on a first side in an axial direction with respect to the rotor,
the output differential gear mechanism is disposed on the first side in the axial direction with respect to the planetary gear mechanism,
the input element is supported in the radial direction with respect to the case via a second support bearing disposed on the first side in the axial direction with respect to a plurality of gears constituting the output differential gear mechanism, the axial direction being a direction along the rotation axis of the rotor, the first side in the axial direction being one side in the axial direction, and a second side in the axial direction being the other side in the axial direction,
the output differential gear mechanism includes a differential case, a shaft member disposed so as to be supported by the differential case and extend in the radial direction, a first bevel gear housed in the differential case and rotatably supported by the shaft member, and a pair of second bevel gears housed in the differential case and meshing with the first bevel gear on both sides in the axial direction with respect to the shaft member,
the differential case is the input element,
the first output member is disposed on the first side in the axial direction with respect to the second output member,
the second output member is disposed so as to extend through an inner side in the radial direction of a differential case target portion in the axial direction, and
a third support bearing is disposed between an inner peripheral surface of the differential case target portion and an outer peripheral surface of the second output member, the differential case target portion being a part of the differential case that is located on the second side in the axial direction with respect to a middle position in the axial direction of the output differential gear mechanism.

2. The vehicle drive device according to claim 1, wherein:
the output differential gear mechanism is a planetary gear mechanism including a second sun gear, a second carrier, and a third ring gear;
the second sun gear is connected to the first output member so as to rotate with the first output member;
the second carrier is connected to the second output member so as to rotate with the second output member; and
the third ring gear is the input element.

3. The vehicle drive device according to claim 1, wherein:
the case includes a first support wall portion disposed between the rotating electrical machine and the planetary gear mechanism in an axial direction; and
the first support bearing is supported by the first support wall portion and is configured to support the first sun gear in the radial direction and support the rotor in the radial direction, the axial direction being a direction along the rotation axis of the rotor.

4. The vehicle drive device according to claim 1, wherein:
the first pinion gear and the second pinion gear are helical gears; and
a direction of a thrust load the first pinion gear receives from the first sun gear and a direction of a thrust load the second pinion gear receives from the second ring gear are opposite to a direction of a thrust load the first pinion gear receives from the first ring gear.

5. A vehicle drive device, comprising:
a rotating electrical machine including a rotor;
a first output member drivingly connected to a first wheel;
a second output member drivingly connected to a second wheel;
a planetary gear mechanism that reduces a speed of rotation of the rotor;
an output differential gear mechanism that includes an input element and that distributes rotation transmitted from the planetary gear mechanism to the input element to the first output member and the second output member; and
a case housing the rotating electrical machine, the planetary gear mechanism, and the output differential gear mechanism, wherein
the rotating electrical machine, the first output member, the second output member, the planetary gear mechanism, and the output differential gear mechanism are disposed coaxially,
the planetary gear mechanism includes a first rotating element, a second rotating element, a third rotating element, and a fourth rotating element, and is configured in such a manner that rotational speeds of the first to fourth rotating elements are in an order of the first rotating element, the second rotating element, the third rotating element, and the fourth rotating element,
the first rotating element is a first sun gear connected to the rotor so as to rotate with the rotor,
the third rotating element is a first ring gear connected to the case,
the fourth rotating element is a second ring gear connected to the input element so as to rotate with the input element,
the second rotating element is a first carrier rotatably supporting a first pinion gear and a second pinion gear that rotate together,
the first pinion gear meshes with the first sun gear and the first ring gear,
the second pinion gear has a smaller diameter than the first pinion gear and meshes with the second ring gear,
the first sun gear is supported in a radial direction with respect to the case via a first support bearing, and the second ring gear and the input element are connected in such a manner that relative movement between the second ring gear and the input element in the radial direction is restricted, the radial direction being a direction perpendicular to a rotation axis of the rotor,
the second ring gear includes a fitting inner peripheral surface facing toward an inner side in the radial direction;
the input element includes a fitting outer peripheral surface facing toward an outer side in the radial direction; and
the second ring gear and the input element are fixed to each other by welding with the fitting inner peripheral surface and the fitting outer peripheral surface fitted together so as to contact each other in the radial direction.

6. A vehicle drive device, comprising:
a rotating electrical machine including a rotor;
a first output member drivingly connected to a first wheel;
a second output member drivingly connected to a second wheel;
a planetary gear mechanism that reduces a speed of rotation of the rotor;
an output differential gear mechanism that includes an input element and that distributes rotation transmitted from the planetary gear mechanism to the input element to the first output member and the second output member; and
a case housing the rotating electrical machine, the planetary gear mechanism, and the output differential gear mechanism, wherein
the rotating electrical machine, the first output member, the second output member, the planetary gear mechanism, and the output differential gear mechanism are disposed coaxially,
the planetary gear mechanism includes a first rotating element, a second rotating element, a third rotating element, and a fourth rotating element, and is configured in such a manner that rotational speeds of the first to fourth rotating elements are in an order of the first rotating element, the second rotating element, the third rotating element, and the fourth rotating element,
the first rotating element is a first sun gear connected to the rotor so as to rotate with the rotor,
the third rotating element is a first ring gear connected to the case,
the fourth rotating element is a second ring gear connected to the input element so as to rotate with the input element,
the second rotating element is a first carrier rotatably supporting a first pinion gear and a second pinion gear that rotate together,
the first pinion gear meshes with the first sun gear and the first ring gear,
the second pinion gear has a smaller diameter than the first pinion gear and meshes with the second ring gear,
the first sun gear is supported in a radial direction with respect to the case via a first support bearing, and the second ring gear and the input element are connected in such a manner that relative movement between the second ring gear and the input element in the radial direction is restricted, the radial direction being a direction perpendicular to a rotation axis of the rotor,
the case includes a second support wall portion disposed on a first side in an axial direction with respect to the output differential gear mechanism; and
the input element is supported in the radial direction by a plain bearing or a needle roller bearing disposed between the input element and the second support wall portion in the radial direction, and is supported in the axial direction by a thrust bearing disposed between the input element and the second support wall portion in the axial direction, the axial direction being a direction along the rotation axis of the rotor, the first side in the axial direction being one side in the axial direction, and a second side in the axial direction being the other side in the axial direction.

* * * * *